(12) United States Patent
Atanassov et al.

(10) Patent No.: US 9,207,070 B2
(45) Date of Patent: Dec. 8, 2015

(54) TRANSMISSION OF AFFINE-INVARIANT SPATIAL MASK FOR ACTIVE DEPTH SENSING

(71) Applicant: QUALCOMM Incorporated, San Diego, CA (US)

(72) Inventors: Kalin Mitkov Atanassov, San Diego, CA (US); James Wilson Nash, San Diego, CA (US); Vikas Ramachandra, San Diego, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 13/785,797

(22) Filed: Mar. 5, 2013

(65) Prior Publication Data
US 2013/0314696 A1 Nov. 28, 2013

Related U.S. Application Data

(60) Provisional application No. 61/651,528, filed on May 24, 2012, provisional application No. 61/651,529, filed on May 24, 2012, provisional application No. 61/651,533, filed on May 24, 2012, provisional application No. 61/651,535, filed on May 24, 2012, provisional application No. 61/666,405, filed on Jun. 29, 2012.

(51) Int. Cl.
*G01B 11/25* (2006.01)
*G06T 7/00* (2006.01)
*G06T 5/00* (2006.01)

(52) U.S. Cl.
CPC .......... *G01B 11/254* (2013.01); *G01B 11/2513* (2013.01); *G01B 11/2545* (2013.01); *G06T 5/001* (2013.01); *G06T 7/0057* (2013.01)

(58) Field of Classification Search
CPC ............... G01B 11/25; G01B 11/2513; G01B 11/2545; G01B 11/254; G06T 7/0057; G06T 5/001
See application file for complete search history.

(56) References Cited

U.S. PATENT DOCUMENTS

| 6,754,370 B1 | 6/2004 | Hall-Holt et al. |
| 7,013,040 B2 | 3/2006 | Shiratani |

(Continued)

FOREIGN PATENT DOCUMENTS

| DE | 102006015159 A1 | 10/2007 |
| EP | 1624675 A1 | 2/2006 |

(Continued)

OTHER PUBLICATIONS

Andrew Portnoy, "Coded measurement for imaging and spectroscopy", Department of electrical and computer engineering Duke University, 2009, 120 pages.*

(Continued)

*Primary Examiner* — David Porta
*Assistant Examiner* — Mindy Vu
(74) *Attorney, Agent, or Firm* — Toler Law Group, PC

(57) ABSTRACT

A method operational on a transmitter device is provided for projecting a composite code mask. A composite code mask on a tangible medium is obtained, where the composite code mask includes a code layer combined with a carrier layer. The code layer may include uniquely identifiable spatially-coded codewords defined by a plurality of symbols. The carrier layer may be independently ascertainable and distinct from the code layer and includes a plurality of reference objects that are robust to distortion upon projection. At least one of the code layer and carrier layer may be pre-shaped by a synthetic point spread function prior to projection. At least a portion of the composite code mask is projected, by the transmitter device, onto a target object to help a receiver ascertain depth information for the target object with a single projection of the composite code mask.

64 Claims, 35 Drawing Sheets

(56) References Cited

U.S. PATENT DOCUMENTS

| | | |
|---|---|---|
| 7,388,678 B2 | 6/2008 | Forster et al. |
| 7,430,312 B2 | 9/2008 | Gu |
| 7,672,505 B2 | 3/2010 | Sasaki |
| 7,768,656 B2 | 8/2010 | Lapa et al. |
| 7,844,079 B2 | 11/2010 | Hassebrook et al. |
| 7,916,932 B2 | 3/2011 | Lee et al. |
| 7,940,269 B2 | 5/2011 | Zhou et al. |
| 8,090,194 B2 | 1/2012 | Gordon et al. |
| 8,208,719 B2 | 6/2012 | Gordon et al. |
| 8,213,707 B2 | 7/2012 | Li et al. |
| 8,218,858 B2 | 7/2012 | Gu |
| 8,832,954 B2 | 9/2014 | Atwell et al. |
| 2005/0226414 A1 | 10/2005 | Lee et al. |
| 2006/0082574 A1 | 4/2006 | Tsubaki |
| 2007/0123110 A1 | 5/2007 | Schwartz |
| 2008/0205748 A1 | 8/2008 | Lee et al. |
| 2009/0066693 A1 | 3/2009 | Carson |
| 2010/0177164 A1 | 7/2010 | Zalevsky et al. |
| 2010/0290698 A1 | 11/2010 | Freedman et al. |
| 2011/0050685 A1 | 3/2011 | Yamada |
| 2011/0050859 A1 | 3/2011 | Kimmel et al. |
| 2011/0080471 A1* | 4/2011 | Song et al. .............. 348/46 |
| 2011/0164114 A1 | 7/2011 | Kobayashi et al. |
| 2011/0181693 A1 | 7/2011 | Lee et al. |
| 2011/0181704 A1 | 7/2011 | Gordon et al. |
| 2011/0298898 A1 | 12/2011 | Jung et al. |
| 2011/0310226 A1 | 12/2011 | McEldowney |
| 2012/0113229 A1 | 5/2012 | Hassebrook et al. |
| 2012/0120054 A1 | 5/2012 | Sandrew et al. |
| 2012/0154576 A1 | 6/2012 | Weston et al. |
| 2012/0162371 A1 | 6/2012 | Ota |
| 2012/0200671 A1 | 8/2012 | Silveira et al. |
| 2013/0315354 A1 | 11/2013 | Atanassov et al. |
| 2013/0315501 A1 | 11/2013 | Atanassov et al. |

FOREIGN PATENT DOCUMENTS

| | | |
|---|---|---|
| JP | 2005091176 A | 4/2005 |
| WO | 0010323 A1 | 2/2000 |

OTHER PUBLICATIONS

Albitar, C. et al., "Robust Structured Light Coding for 3D Reconstruction", 2007 IEEE 11th International Conference on Computer Vision, ICCV 2007, Rio De Janeiro, Brazil, Oct. 14-21, 2007, IEEE Service Center, Piscataway, NJ, Oct. 14, 2007, XP002697477, ISBN: 978-1-4244-1631-8, pp. 1-6.

International Search Report and Written Opinion, PCT/US2013/037183, ISA/EPO, Oct. 28, 2013, 8 pages.

Desjardins D., et al., "Dense Stereo Range Sensing with Marching Pseudo-Random Patterns," Fourth Canadian Conference on Computer and Robot Vision (CVR07), IEEE Computer Society, Jun. 1, 2007, pp. 216-226.

* cited by examiner

|      |   |   |   |   |   |   |   |   |   |              |
|------|---|---|---|---|---|---|---|---|---|--------------|
| 1108 | 0 | 1 | 1 | 0 | 1 | 0 | 1 | 1 | 1 | — Codeword-i |
|      | 0 | 0 | 1 | 1 | 0 | 0 | 0 | 1 | 1 | 0 |
| 1106 | 0 | 1 | 0 | 0 | 1 | 0 | 1 | 0 | 0 | 1 |
|      | 0 | 1 | 1 | 1 | 1 | 0 | 1 | 1 | 1 | 1 |
|      | 0 | 0 | 1 | 1 | 0 | 0 | 0 | 1 | 1 | 0 |
|      | 0 | 1 | 0 | 0 | 1 | 0 | 1 | 0 | 0 | 1 |

|      |   |   |   |   |   |   |   |   |   |                |
|------|---|---|---|---|---|---|---|---|---|----------------|
|      | 0 | 1 | 1 | 0 | 1 | 0 | 1 | 1 | 1 |                |
| 1110 | 0 | 0 | 1 | 1 | 0 | 0 | 0 | 1 | 1 | 0 — Codeword-i+1 |
| 1106 | 0 | 1 | 0 | 0 | 1 | 0 | 1 | 0 | 0 | 1 |
|      | 0 | 1 | 1 | 1 | 1 | 0 | 1 | 1 | 1 | 1 |
|      | 0 | 0 | 1 | 1 | 0 | 0 | 0 | 1 | 1 | 0 |
|      | 0 | 1 | 0 | 0 | 1 | 0 | 1 | 0 | 0 | 1 |

|      |   |   |   |   |   |   |   |   |   |                |
|------|---|---|---|---|---|---|---|---|---|----------------|
|      | 0 | 1 | 1 | 0 | 1 | 0 | 1 | 1 | 1 |                |
| 1112 | 0 | 0 | 1 | 1 | 0 | 0 | 0 | 1 | 1 | 0 — Codeword-i+2 |
| 1106 | 0 | 1 | 0 | 0 | 1 | 0 | 1 | 0 | 0 | 1 |
|      | 0 | 1 | 1 | 1 | 1 | 0 | 1 | 1 | 1 | 1 |
|      | 0 | 0 | 1 | 1 | 0 | 0 | 0 | 1 | 1 | 0 |
|      | 0 | 1 | 0 | 0 | 1 | 0 | 1 | 0 | 0 | 1 |

|      |   |   |   |   |   |   |   |   |   |                |
|------|---|---|---|---|---|---|---|---|---|----------------|
|      | 0 | 1 | 1 | 0 | 1 | 0 | 1 | 1 | 1 |                |
| 1114 | 0 | 0 | 1 | 1 | 0 | 0 | 0 | 1 | 1 | 0 — Codeword-i+3 |
| 1106 | 0 | 1 | 0 | 0 | 1 | 0 | 1 | 0 | 0 | 1 |
|      | 0 | 1 | 1 | 1 | 1 | 0 | 1 | 1 | 1 | 1 |
|      | 0 | 0 | 1 | 1 | 0 | 0 | 0 | 1 | 1 | 0 |
|      | 0 | 1 | 0 | 0 | 1 | 0 | 1 | 0 | 0 | 1 |

*FIG. 11B*

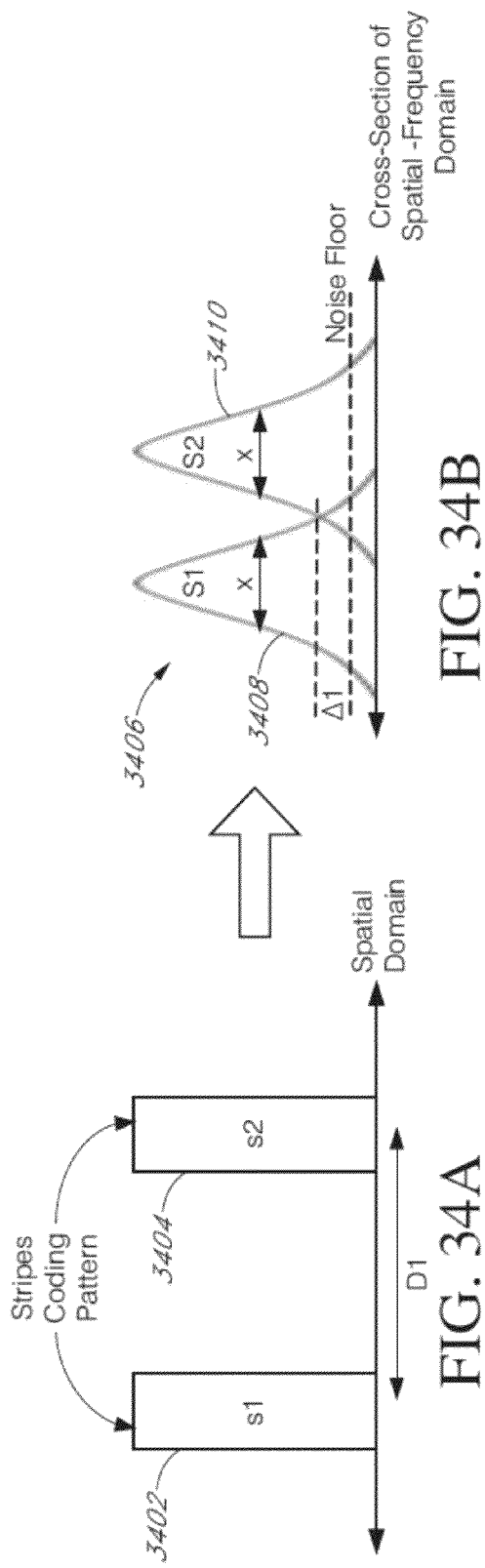
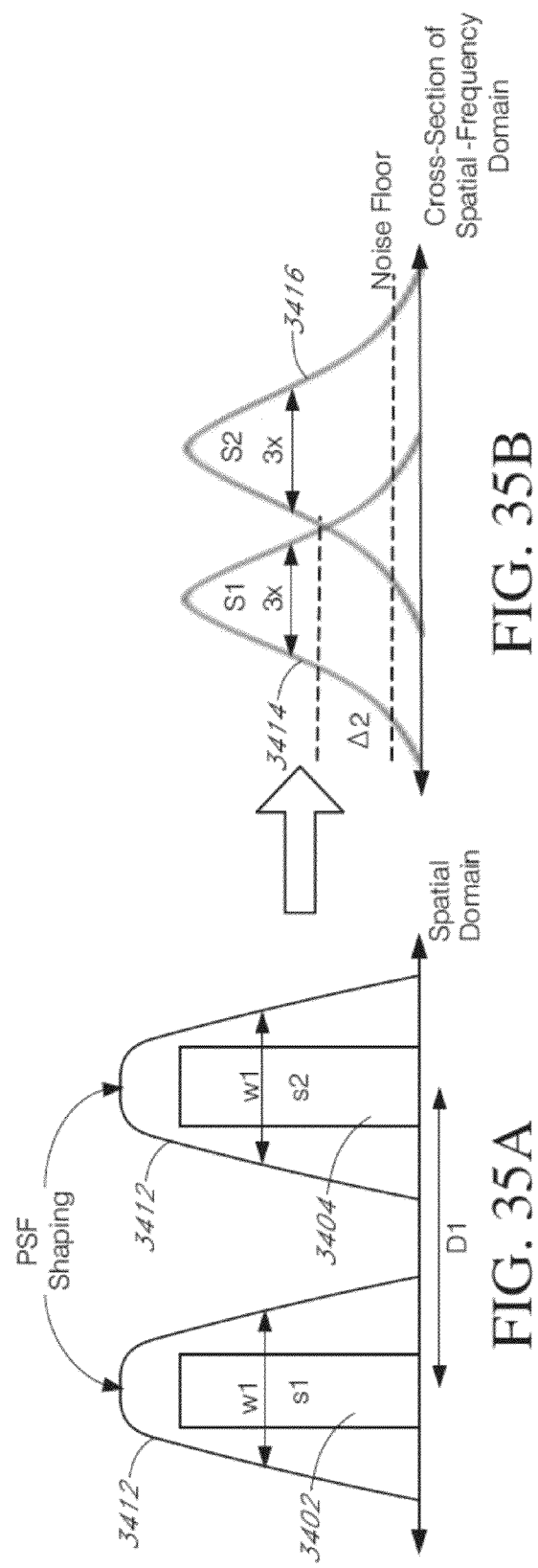

TRANSMISSION OF AFFINE-INVARIANT SPATIAL MASK FOR ACTIVE DEPTH SENSING

CROSS REFERENCE TO RELATED APPLICATIONS

The present application for patent claims priority to U.S. Provisional Application Ser. No. 61/651,528 filed May 24, 2012, Ser. No. 61/651,529 filed May 24, 2012, Ser. No. 61/651,533 filed May 24, 2012, Ser. No. 61/651,535 filed May 24, 2012, and Ser. No. 61/666,405 filed Jun. 29, 2012.

FIELD

Various features pertain to active depth sensing and more specifically to techniques that address distortion of spatial masks used in depth sensing.

BACKGROUND

In active sensing, a spatial mask, comprising a known pattern, is illuminated or projected onto a scene or object. A structure of the pattern projected on the scene or object typically encodes depth information for the scene or object. A receiver sensor captures an image of the scene or object with the spatial mask thereon. The pattern or code within the spatial mask in the captured image is then used to ascertain a depth for the scene or object in the image. This depth information may be used, for instance, to reconstruct a 3-dimensional representation of the scene or object.

Most scenes or objects have varying depths leading to distortions of the pattern in the spatial mask. That is, as the spatial mask is projected onto the scene or object, the curves, depth, shapes of the scene or object cause parts of the pattern projected thereon to become distorted. Such distortion tends to inhibit accurate identification of the pattern of the spatial mask.

Therefore, a solution is needed to correctly recognize spatial codes that may have been distorted under various conditions.

SUMMARY

A method operational on a transmitter device is provided for projecting a composite code mask. A composite code mask is provided on a tangible medium, the composite code mask including a code layer combined with a carrier layer. The code layer may include uniquely identifiable spatially-coded codewords defined by a plurality of symbols. The code layer may comprise n1 by n2 binary symbols, where n1 and n2 are integers greater than two. Overlapping windows along at least one direction on the code layer may define different unique codewords from any other window along the same row or column. In one example, each symbol in the composite code mask is a line segment in one of two gray-scale shades distinct from the reference objects. In some instances, the symbols of the code layer may be staggered in at least one dimension.

The carrier layer may be independently ascertainable and distinct from the code layer and including a plurality of reference objects that are robust to distortion upon projection. The carrier layer reference objects may comprise a plurality of equally spaced reference stripes with a guard interval in between. The reference stripes and the guard interval may be of different widths. In one example, the width of each reference stripe relative to a guard interval width is determined by an expected optical spreading of a transmitter device and/or a receiver device. In another example, the code layer and carrier layer are combined by overlaying the carrier layer over the code layer such that the code layer symbols appear within the reference stripes of the carrier layer.

At least one of the code layer and carrier layer may be pre-shaped by a synthetic point spread function prior to projection. In one example, pre-shaping at least one of the code layer and carrier layer by a synthetic point spread function prior to projection includes: (a) ascertaining one or more conditions for a channel through which the code mask is to be projected, (b) obtaining the synthetic point spread function, based on the one or more conditions, to compensate for the distortions caused by the channel, and/or (c) applying the synthetic point spread function to the at least one of the code layer and the carrier layer. In another example, pre-shaping at least one of the code layer and carrier layer by a synthetic point spread function prior to projection includes: (a) obtaining a pre-shaping layer that compensates for distortions in a channel through which the code mask is to be projected, and/or (b) combining the pre-shaping layer as part of the composite mask.

At least a portion of the composite code mask may be projected, from the transmitter device, onto a target object to help a receiver ascertain depth information for the target object with a single projection of the composite code mask. The composite code mask may be projected in an infrared spectrum.

Similarly, a transmitter device for projecting a composite code mask is provided. The transmitter device may include a medium defining a composite code mask, the composite code mask including a code layer combined with a carrier layer. The code layer may include uniquely identifiable spatially-coded codewords defined by a plurality of symbols. The carrier layer may be independently ascertainable and distinct from the code layer and includes a plurality of reference objects that are robust to distortion upon projection. At least one of the code layer and carrier layer may be pre-shaped by a synthetic point spread function prior to projection. The transmitter device may also include a projector for projecting at least a portion of the composite code mask onto a target object to help a receiver ascertain depth information for the target object with a single projection of the composite code mask.

Additionally, a method for generating a composite code mask is also provided. A code layer of uniquely identifiable spatially-coded codewords defined by a plurality of symbols is obtained. The code layer may comprise n1 by n2 binary symbols, where n1 and n2 are integers greater than two. Overlapping windows along at least one direction on the code layer may define different unique codewords from any other window along the same row or column. The symbols of the code layer may be staggered in at least one dimension.

A carrier layer is also obtained that is independently ascertainable and distinct from the code layer and including a plurality of reference objects that are robust to distortion upon projection. In one example, the carrier layer reference objects may comprise a plurality of equally spaced reference stripes with a guard interval in between. The reference stripes and the guard interval may be of different widths. The code layer and carrier layer may be combined by overlaying the carrier layer over the code layer such that the code layer symbols appear within the reference stripes of the carrier layer.

At least one of the code layer and carrier layer may be pre-shaped by a synthetic point spread function prior to projection. A composite code mask may then be obtained by combining the code layer and carrier layer, the composite code mask serving for single-projection depth sensing.

In one example, pre-shaping at least one of the code layer and carrier layer by a synthetic point spread function prior to projection may include: (a) ascertaining one or more conditions for a channel through which the code mask is to be projected; (b) obtaining the synthetic point spread function, based on the one or more conditions, to compensate for the distortions caused by the channel; and/or (c) applying the synthetic point spread function to the at least one of the code layer and the carrier layer. In another example, pre-shaping at least one of the code layer and carrier layer by a synthetic point spread function prior to projection may include: (a) obtaining a pre-shaping layer that compensates for distortions in a channel through which the code mask is to be projected; and/or (b) combining the pre-shaping layer as part of the composite mask.

A transmitter device may dynamically perform the pre-shaping of the at least one of the code layer and carrier layer and combines the code layer and carrier layer to obtain the composite code mask. In one example, the transmitter device may also include a mask generator that pre-generates at least one of the code layer, the carrier layer, and the composite code mask.

The composite code mask may be stored or fixed on a tangible medium. In various examples, the tangible medium may be at least one of: (a) a single film medium embodying the composite code mask; (b) a first file medium storing the code layer and a second film medium storing the carrier layer; (c) a digital storage device in which the composite code mask stored; and/or (d) a digital storage device in which the code layer and carrier layer are stored.

Similarly, a mask generating device may be provided, comprising: a processing circuit and a tangible medium. The processing circuit may be adapted to: (a) obtain a code layer of uniquely identifiable spatially-coded codewords defined by a plurality of symbols; (b) obtain a carrier layer independently ascertainable and distinct from the code layer and including a plurality of reference objects that are robust to distortion upon projection; (c) pre-shape at least one of the code layer and carrier layer by a synthetic point spread function prior to projection; and/or (d) obtain a composite code mask by combining the code layer and carrier layer, the composite code mask serving for single-projection depth sensing.

The tangible medium may serve to store the composite code mask. In various examples, the tangible medium may include at least one of: (a) a single film medium embodying the composite code mask; (b) a first file medium storing the code layer and a second film medium storing the carrier layer; (c) a digital storage device in which the composite code mask stored; and/or (d) a digital storage device in which the code layer and carrier layer are stored.

DRAWINGS

Various features, nature and advantages may become apparent from the detailed description set forth below when taken in conjunction with the drawings in which like reference characters identify correspondingly throughout.

FIG. 34A illustrates carrier stripes of a code mask carrier in the spatial domain.

FIG. 34B illustrates an example of the resulting carrier stripes in the spatial-frequency domain after they have propagated through a transmission channel.

FIG. 35A illustrates how a synthetic point spread function may be applied to carrier stripes to pre-shape the carrier stripes in the spatial domain.

FIG. 35B illustrates an example of the resulting pre-shaped carrier stripes in the spatial-frequency domain after they have propagated through a transmission channel.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order avoid obscuring the embodiments in unnecessary detail. In other instances, well-known circuits, structures and techniques may not be shown in detail in order not to obscure the embodiments.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation.

Overview

A first feature provides a spatial mask that is invariant to distortion by combining a carrier layer (with reference markers) and a code layer (with unique codewords). The carrier layer provides reference markers (e.g., stripes in a known orientation) that allow correcting for distortions (e.g., skews, rotation, compression, elongation, tilting, etc.) of the code layer and thus the correct identification of codewords by a receiver.

According to a second feature, a compact codeword structure and codebook are provided. A compact codeword structure is desirable because it permits greater granularity in ascertaining a depth. However, codewords should be sufficiently large to avoid segmentation. Additionally, a smaller codebook permits faster correlation of a sampled codeword to the possible codewords in the codebook. These goals may be accomplished by defining codewords as overlapping (k1 by k2 symbol windows) that define unique codewords in at least one axis or direction of a code layer.

According to a third feature, a code mask may be generated by replicating or repeating a code primitive one or more times within the code mask. The codebook primitive may be defined as a plurality of spatially-coded and unique codewords within a n1 by n2 symbol structure. Such codebook primitive may be defined from a subset of all codewords possible (e.g., combinations of symbols that are possible within the n1 by n2 symbol structure). The code mask may then be generated by reusing the codebook primitive x times in the code mask.

Exemplary Operating Environment

Figure 1:
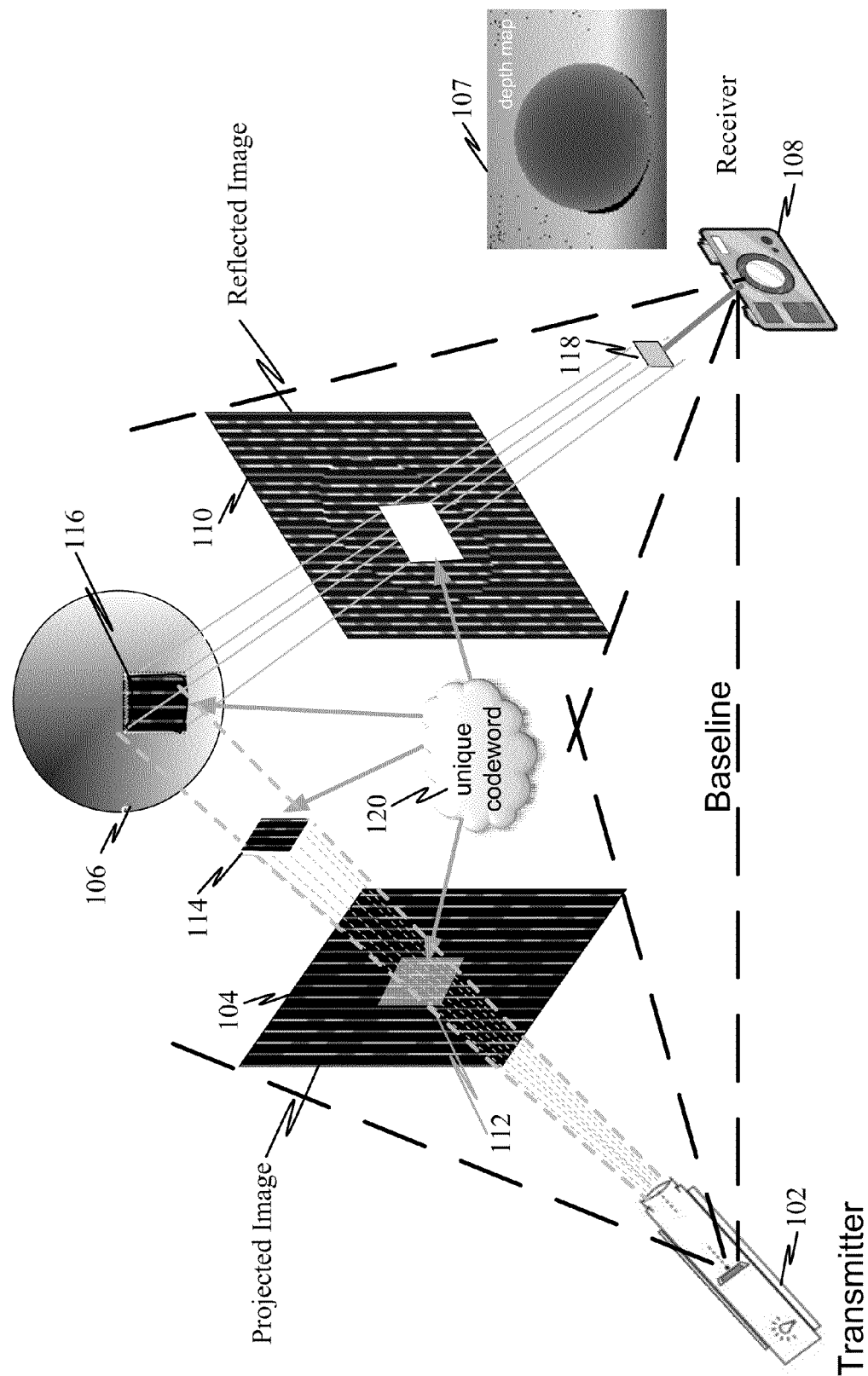
FIG. 1 illustrates an exemplary active sensing system where a known pattern is used to illuminate a scene or object and obtain depth information with which to generate 3-dimensional information from 2-dimensional images and/or information.

FIG. 1 illustrates an exemplary active sensing system where a known pattern is used to illuminate a scene or object and obtain depth information with which to generate 3-dimensional information from 2-dimensional images and/or information. One or more aspects and/or features described herein may be implemented within such exemplary active sensing system. Here, a transmitter 102 projects a light field through a code mask 104 (e.g., image with codes) to project codewords on an object or scene 106. A receiver 108 captures the projected code mask 110 and codewords therein. This example illustrates how a section/portion/window 112 of the code mask 104 is projected (as section/portion/window 114) onto the surface (e.g., projected section/portion/window 116) of the object or scene 106. The projected section/portion/window 116 may then be captured by the receiver 108 as a captured segment 118. The section/portion/window 112 may be used as a codeword that can be uniquely identified. Thus, by covering the scene or object 106 with unique codewords in this manner, sections/portions of the scene or object 106 may be identified/tagged and this information may be used for depth sensing.

From the image captured by the receiver 108, multiple segments may be identified over the scene or object 106. Each segment 118 may be uniquely identifiable at the receiver 108 and its location relative to other segments ascertained from the known pattern of the coded mask 104. The identification of a code from each segment/portion/window may involve pattern segmentation (e.g., to address distortion) and decoding of the perceived segment/portion/window into a corresponding code(s). Additionally, triangulation may be applied over each captured segment/portion/window to ascertain an orientation and/or depth. Multiple such segments/portions/windows may be combined to stitch together a captured image pattern. In this manner, a map of depth may be generated for the scene or object 106.

Figure 2:
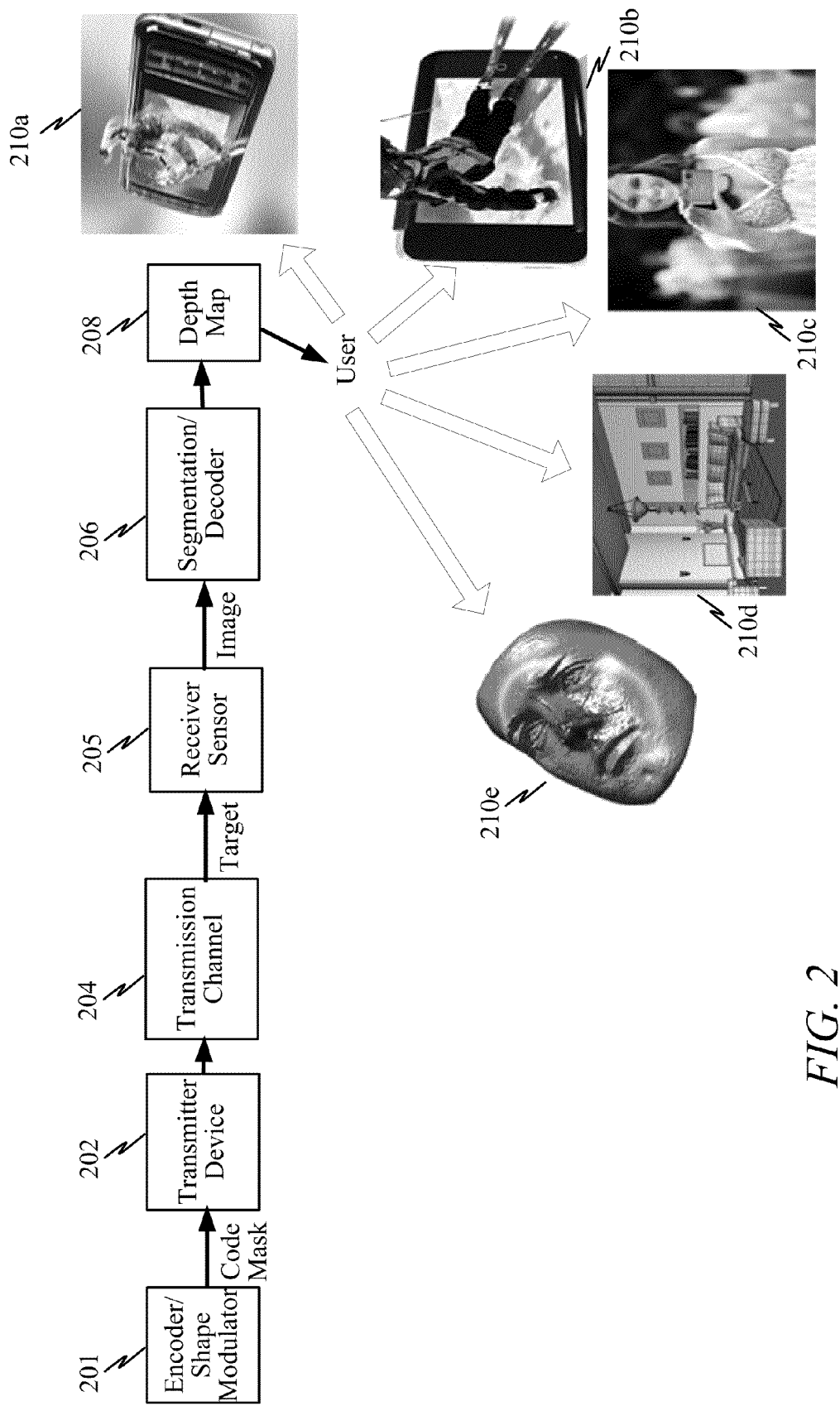
FIG. 2 illustrates another exemplary system for active sensing where a 3-dimensional (3D) scene is constructed from 2-dimensional (2D) images or information.

FIG. 2 illustrates another exemplary system for active sensing where a 3-dimensional (3D) scene is constructed from 2-dimensional (2D) images or information. An encoder/shape modulator 201 may serve to generate a code mask which is then projected by a transmitter device 202 over a transmission channel 204. The code mask may be projected onto a target (e.g., a scene or object) and the reflected light is captured by a receiver sensor 205 as an image (e.g., code mask image). At the receiver sensor 205 (e.g., receiver 108 in FIG. 1), the target (e.g., scene or object) is captured and its shape/depth is encoded 205. Shape/depth encoding may be achieved, for example, using the projected code mask to ascertain the depth information. For instance, the captured image of the scene or object (which includes the projected code mask) may be decoded 206 to obtain a depth map 208. The depth map 208 may then be used to present, generate, and/or provide a 3-dimensional version 210a-e of the target.

Active sensing relies on being able to recognize (at the receiver sensor 205 and/or decoder 206) all spatial codes (i.e., codewords) from the code mask being projected by the transmitter device 202 on a scene or object. If a scene or object is too close to transmitter/receiver, the surface of the scene or object is angled/curved, and/or a baseline reference plane is tilted, the codes become modified under unknown affine transformation (e.g., rotation, skew, compression, elongation, etc.).

One or more aspects or features described herein may be implemented within the exemplary environments of FIGS. 1 and 2.

Exemplary Active Depth Sensing

Figure 3:
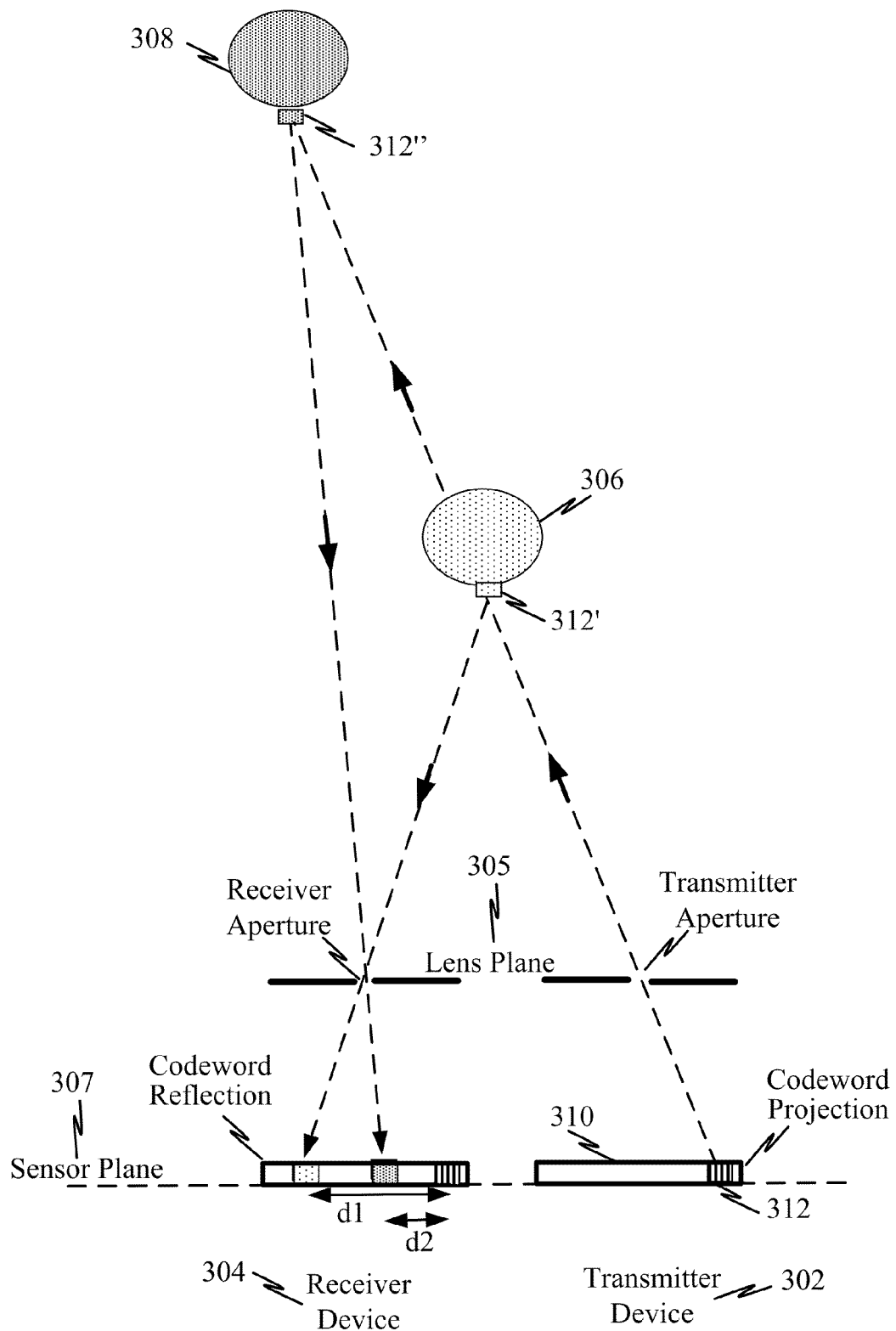
FIG. 3 illustrates how depth may be sensed for an object or scene.

FIG. 3 illustrates how depth may be sensed for an object or scene. Here, a transmitter device 302 is on the same baseline reference plane (e.g., lens plane 305) as the receiver device 304. The transmitter device 302 projects a code mask 310 onto a scene or object through an aperture or lens. Here, for purposes of illustration, a projected segment/portion/window 312 (representing a codeword) is shown as part of the transmitted code mask 310. This code segment/portion/window 312 may be projected on a scene or object 306 at a first distance or at a second distance. The receiver device 304 captures the projected code mask 310 (as a received code mask 311) through a receiver aperture. Here, the transmitted code mask 310 is shown on the same sensor plane 307 as the received code mask 311. It can be appreciated that when the scene or object 306 is located closer to the transmitter device 302 (e.g., a first distance from the transmitter device) the projected segment 312 appears at a distance d1 from its initial location. Meanwhile, when the scene or object 308 is located further away (e.g., a second distance from the transmitter device), the projected segment/portion/window 312 appears at a distance d2 from its initial location (where d2<d1). That is, the further away an object is from the transmitter/receiver, the closer the received projected segment/portion/window is from its original position at the receiver device 304 (e.g., the outgoing projection and incoming projection are more parallel). Conversely, the closer an object is from the transmitter/receiver, the further the received projected segment/portion/window is from its original position at the receiver device 304. Thus, the difference between received and transmitted codeword position gives the depth of the scene or object. In one example, such depth (e.g., relative depth) may provide a depth for each pixel or subset of grouped pixels (e.g., regions of two or more pixels).

Various types of modulation and coding schemes have been conceived to generate a code mask. These modulation and coding schemes include temporal coding, spatial coding, and direct codification. However, there are drawbacks to each scheme.

In temporal coding, patterns are successively projected onto the measuring surface (e.g., over time). This technique has high accuracy and resolution but is not suitable for dynamic scenes.

In spatial coding, information is encoded in a local neighborhood based on shapes and patterns. Pseudorandom codes may be based on De-Bruijn or M-arrays define the codebook (e.g., m-ary intensity or color modulation). However, pattern segmentation is crucial and not easily attained where the shapes and patterns are distorted.

In direct codification, both horizontal and vertical pixel coordinates are encoded. Modulation may be by a monotonic phase or an intensity waveform. However, this scheme requires a large codebook to implement. Because, upon capture every codeword must be correlated against a defined set of possible codewords (e.g., in a codebook), the use of a small set of codewords (e.g., small codebook) is desirable. Also, the minimum distance is small which causes errors.

Projective Distortion Problem

Figure 4:
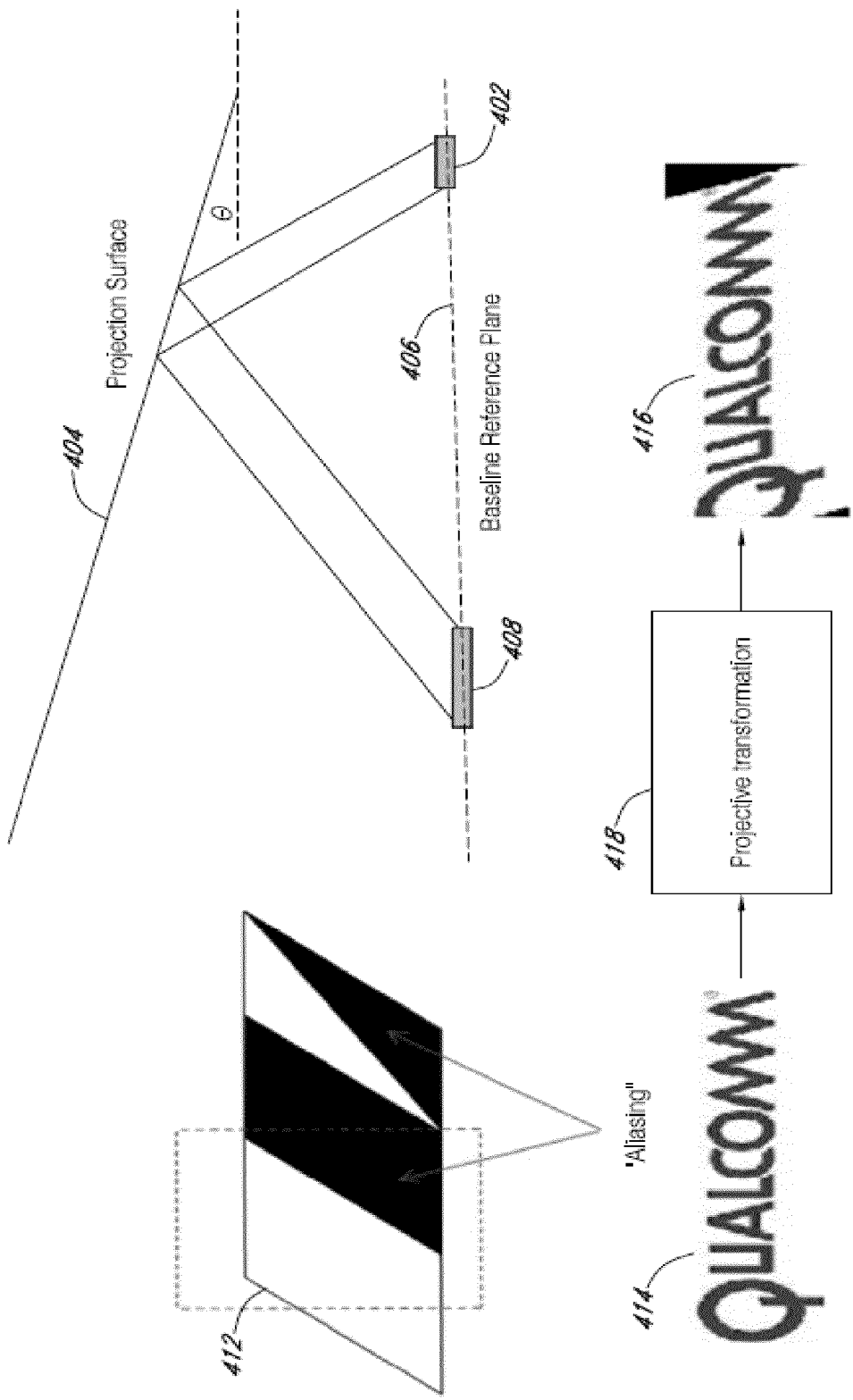
FIG. 4 illustrates an example of projective distortion which is a problem in accurately identifying a projected code.

FIG. 4 illustrates an example of projective distortion which is a problem in accurately identifying a projected code. Here, a code mask segment 402 has been projected on a surface 404 that is at an angle θ to the baseline reference plane 406 between a transmitter and receiver. Consequently, there is distortion of the received code mask segment 408. At close range, oblique surfaces cause projective distortion, which may result in warping patterns, shifting outside the field of view, and/or code aliasing. Aliasing of a received code mask segment 412 is illustrated here. Also, projective distortion is illustrated where the word "Qualcomm" 414 has been distorted 416 by projective transformation 418.

Figure 5:
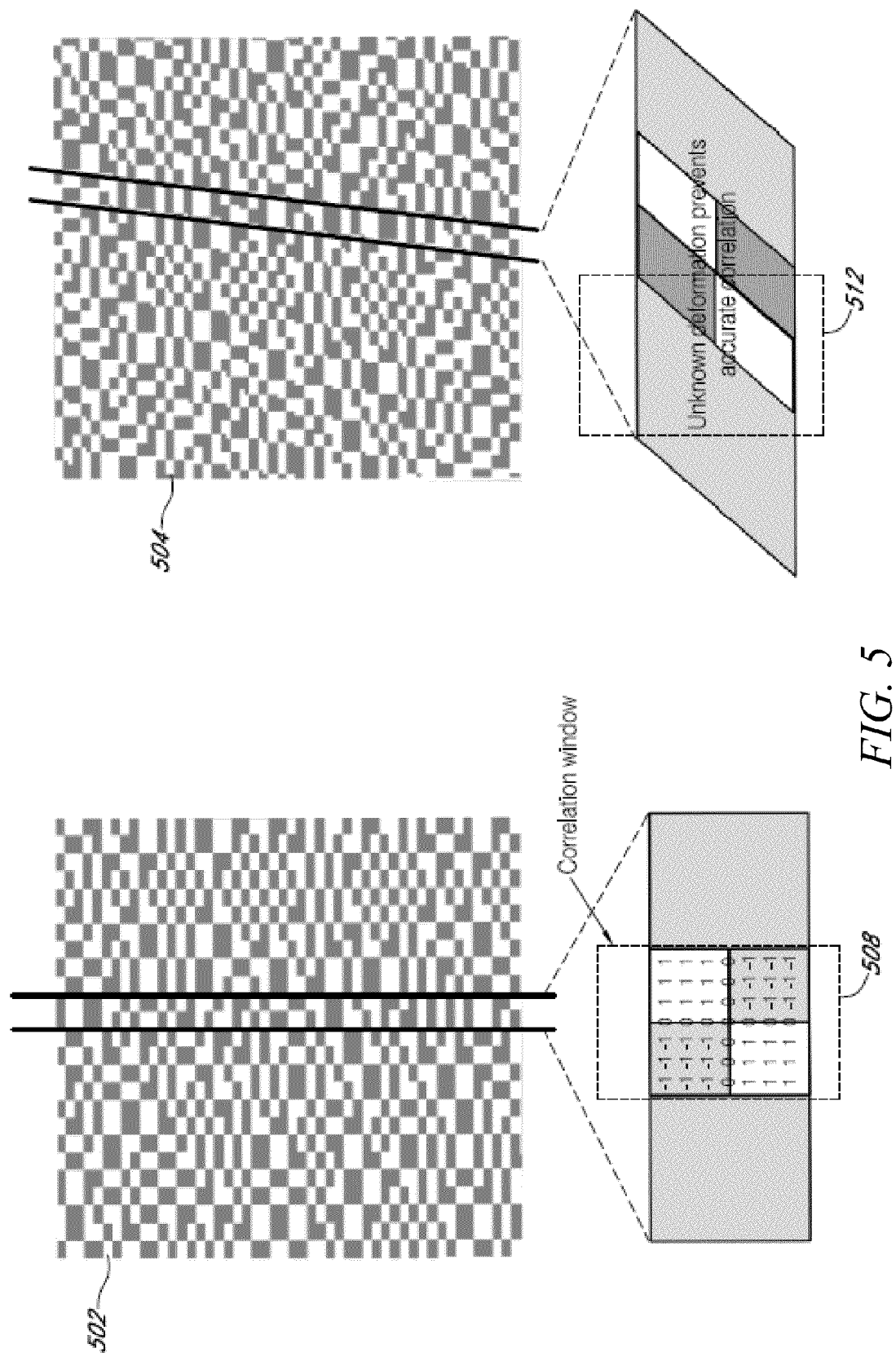
FIG. 5 illustrates another example of projective distortion.

FIG. 5 illustrates another example of projective distortion. Here, a typical code mask 502 has been projected on a surface and the received/captured code mask 504 has been distorted. Distributed codes are not robust to projective distortion during segmentation. Accurate segmentation requires complex registration and contextual information. Correlation windows 508 and 512 are used to attempt to recover the original code mask. However, as illustrated here, the receiver correlation window 512 only captures a portion of the distorted code mask segment.

Figure 6:
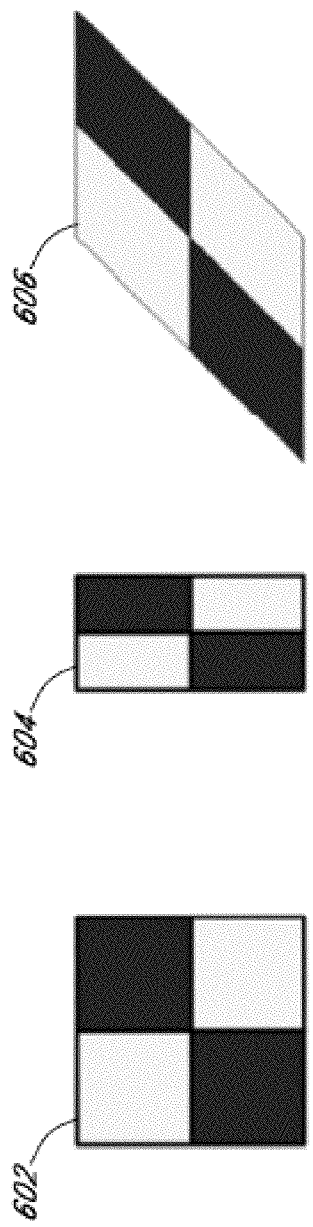
FIG. 6 illustrates an example of distortion problem encountered by typical spatial coding for active sensing.

FIG. 6 illustrates an example of distortion problem encountered by typical spatial coding for active sensing. Active sensing relies on being able to recognize all spatial codes. If object is close to transmitter/receiver and/or the plane is tilted, the code becomes modified under an unknown affine transform. Here, an initial code 602 has been distorted by the surface or plane of the object onto which it is projected or due to misalignment of the transmitter and receiver. Hence, in some examples, the received code 604 may be narrower than expected and/or the received code 606 may be tilted or slanted, making detection of the correct code difficult.

Figure 7:
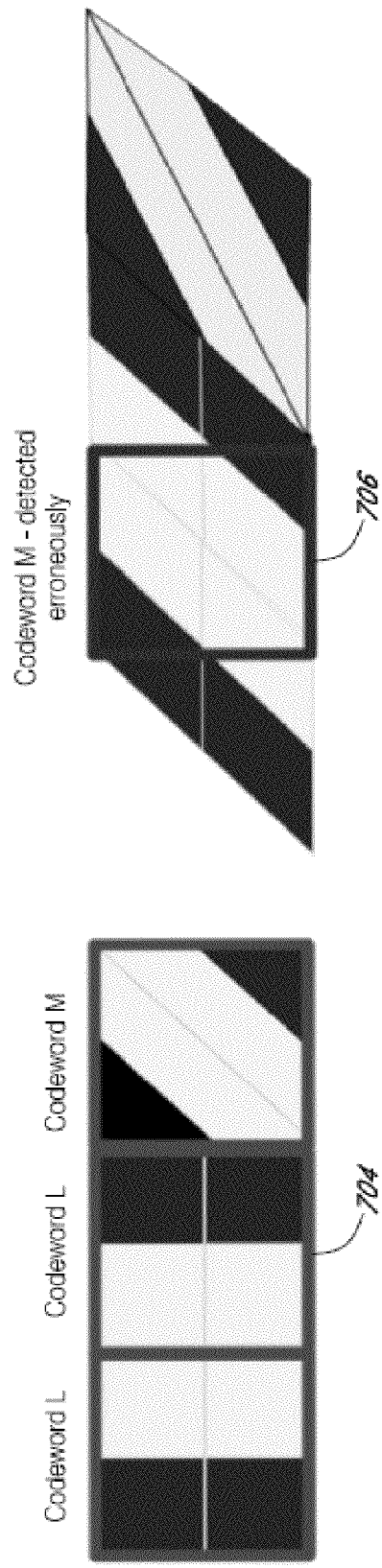
FIG. 7 illustrates another example of distortion problem encountered by typical spatial coding for active sensing.

FIG. 7 illustrates another example of distortion problem encountered by typical spatial coding for active sensing. In these examples illustrates that, in spatial coding, a codeword may be transformed into another valid codeword, thus making active sensing difficult. For example, a first set of adjacent codewords 702 may be projected onto an object plane or surface that causes the codewords to be tilted 508. Consequently, a first codeword 704 may be incorrectly detected as a transformed codeword 706. Note that while the first codeword 704 had a white stripe followed by a black stripe, the transformed codeword 706 is largely white and can be misconstrued as a valid codeword.

Exemplary Composite Code Mask

Figure 8:
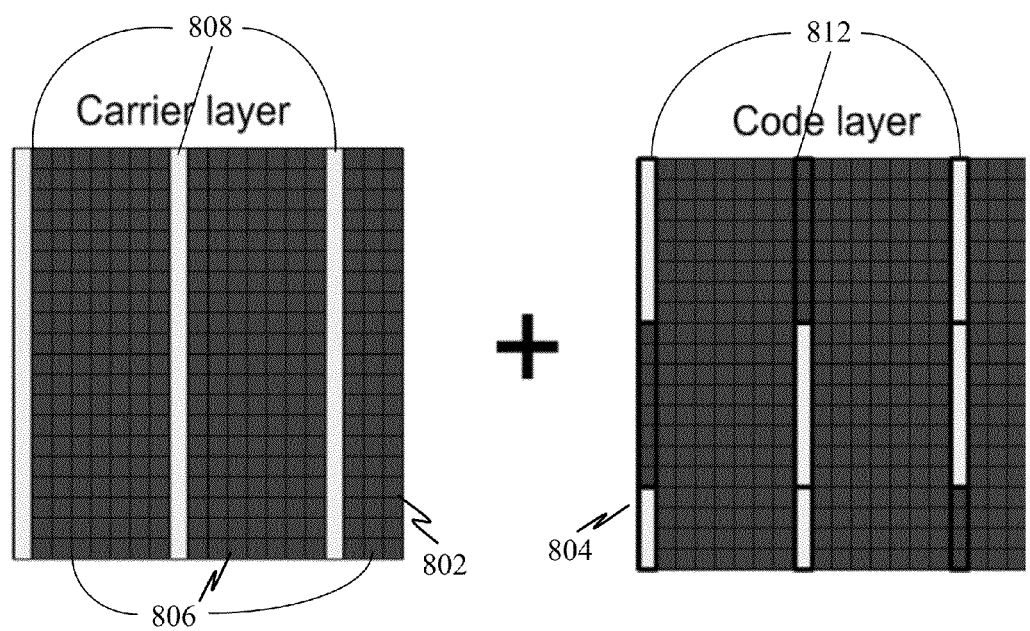
FIG. 8 illustrates a solution to the distortion problem with spatial coding.

FIG. 8 illustrates a solution to the distortion problem with spatial coding. In this approach, the code mask may be constructed by a carrier layer 802 overlayed on the code layer 804. Here, the carrier layer 802 may include wide black lines 806 (i.e., guard intervals) with thinner white lines 808 (i.e., reference stripes) in between. The thin white lines 808 (i.e., reference stripes) corresponding to the location of code stripes 812 in the code layer 804. The carrier layer 802 is a redundant layer that can be extracted and used to estimate the affine transform of the codeword. The code layer 804 is the actual binary pattern specifying the different codewords comprising the code mask.

Figure 9:
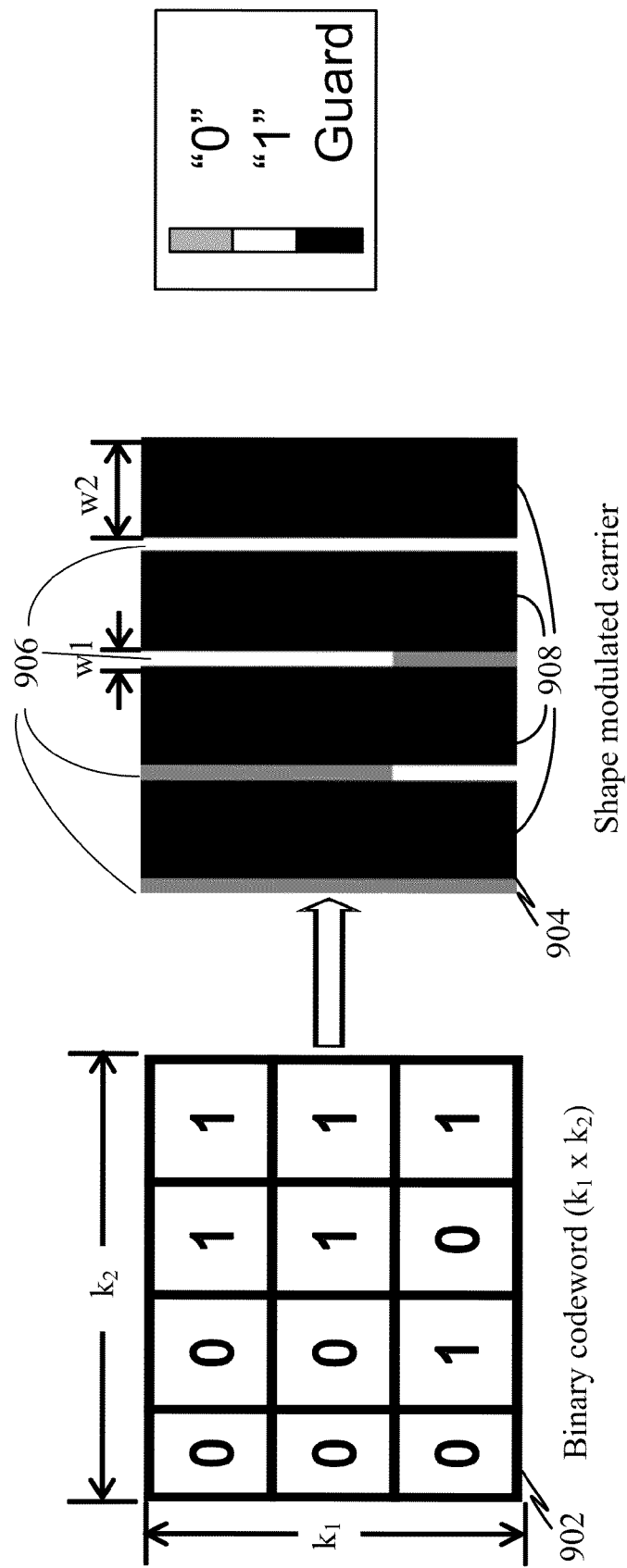
FIG. 9 illustrates how a binary codeword may be represented within a shape modulated carrier.

FIG. 9 illustrates how a binary codeword 902 may be represented within a shape modulated carrier 904. The modulated carrier 904 may include code/reference stripes 906 (e.g., active stripes) and guard intervals 908. The carrier layer 902 may be defined by an active stripe width w1 and a guard interval w2. The active stripe width w1 may be determined by power requirements on the transmitter. The guard interval w2 may be determined by transmitter/receiver Point Spread Function (PSF). Here, a tri-state gray-scale system is used to represent the guard, "0" and "1", where the "0" and "1" levels ratio may be 50%.

Figure 10:
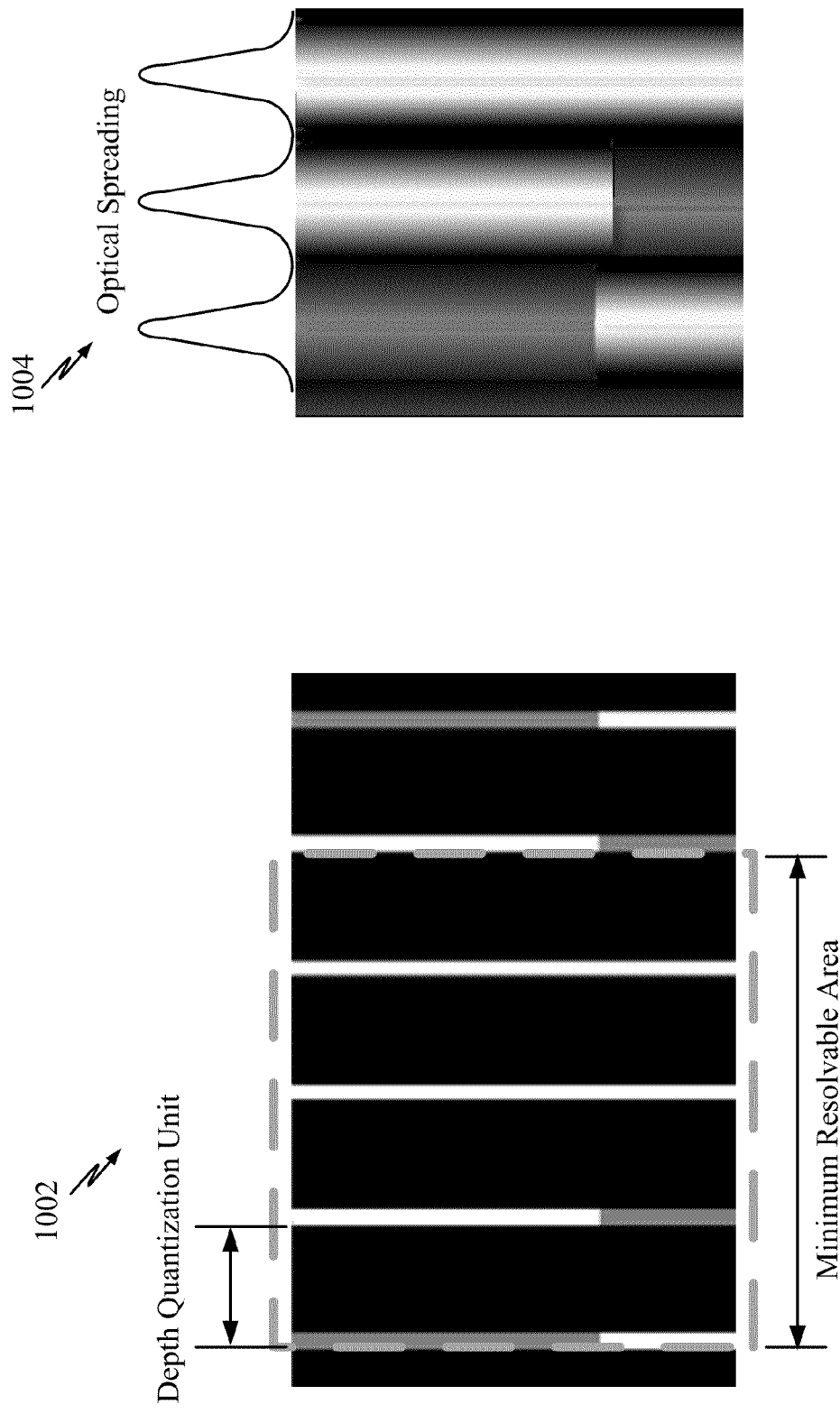
FIG. 10 illustrates further details of the code microstructure using a carrier layer and code layer.

FIG. 10 illustrates further details of the code microstructure 1002 using a carrier layer and code layer. In this example, the size of the code mask may be n1×n2, where n1=7 (vertical), n2=585 (horizontal), such that a total of 4095 unique codewords are possible. Smaller codebooks are possible by using a subset of these codewords. Smaller codebooks may be desirable in that it reduces the number of comparisons that must be performed to ascertain whether a codeword match is found. That is, a received/captured code mask may be compared to the codebook used to ascertain each codeword therein. Such comparison may involve matching a region of the received/captured code mask each codeword defined in the codebook to ascertain a match (e.g., or closest match). Consequently, reducing the size of the codebook (e.g., using a small number of codewords) reduces the number of comparisons needed to find a codeword match and reduces the processing resources and/or time to find codeword matches for the received/captured code mask.

The size of a code mask window (e.g., k1×k2 window) used for a codeword may be dependent on the minimum detectable object sought. For example, the code mask window may be a $k_1 \times k_2 = 3 \times 4$ symbol window. Hence, the window size is defined by the minimum detectable object size (e.g., detectable object or feature) and distance at which such object detection occurs. Additionally, depth resolution may be equal to carrier spacing. The guard interval is countermeasure against unknown spreading. The selected parameters may provide a balance between resolution and detection.

The design of the code structure has an effect on how efficiently codeword detection can be implemented. For example, it would be preferable that a code is able to support both static and dynamic scenes (e.g., in case on object is in motion), so that the code mask can be deployed in one shot or projection. The code should have high depth resolution, which implies a large number of codewords. However, the codes should be densely packed, e.g. tessellated codewords must be unique. The code should be robust against occlusions and jump boundaries. Therefore, a compact window may be less likely to be disrupted than an elongated one. The code should also have high feature resolution so that details of an object or scene can be more readily detected (e.g., have a small modulating "shape waveform"). The code should also be low complexity in terms of segmentation (e.g., pattern should be simple). The code should be robust to projective distortion (e.g., pattern should be relatively invariant to projective transformations). Additionally, the code should be robust to reflectance variation and interference (e.g., modulation should require only a few intensity levels).

Figure 11A:
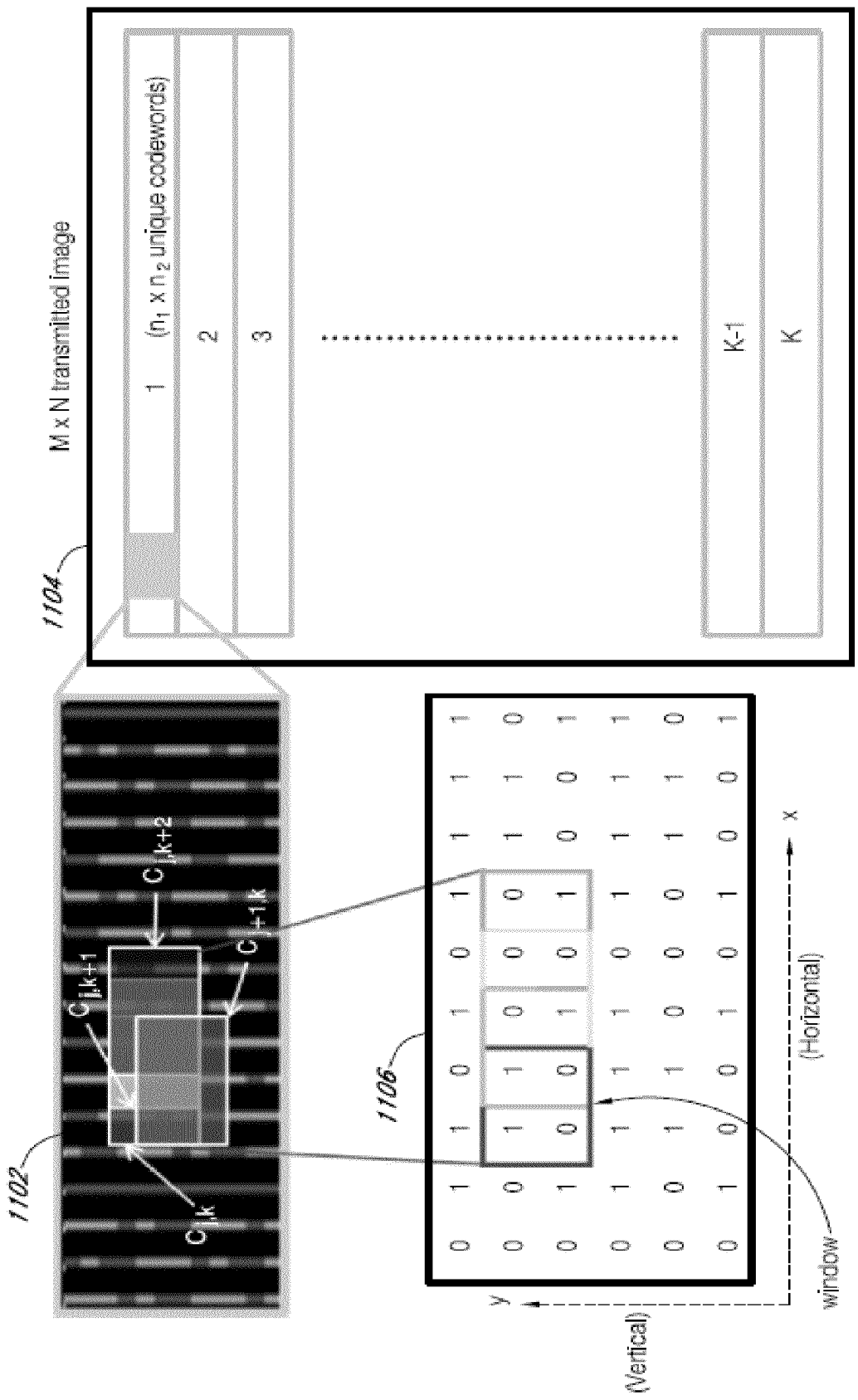
FIG. 11 (comprising FIGS. 11A and 11B) illustrates further details of the code microstructure using a carrier layer and code layer.

FIG. 11 (comprising FIGS. 11A and 11B) illustrates further details of the code microstructure using a carrier layer and code layer. An exemplary code mask 1106 (e.g., symbol structure) may be rendered as a plurality of oriented symbols (e.g., line segments) and combined with a carrier layer to generate a composite code mask 1102. Each codeword may be represented by a window of symbols (e.g., line segments). For example, a plurality of codewords is represented here, where the windows are overlapping. FIG. 11B illustrates how a plurality of codewords may be defined by overlapping windows 1108, 1110, 1112, and 1114.

In one implementation, the transmitter and receiver may be setup on the same horizontal plane. The code layer 1106 is maximally dense due to its perfect window property, which means that unique codes are defined by all overlapping windows (e.g., for at least the same column or row of the code layer). Shifting the window by one unit in at least one direction (e.g., horizontally) results in a unique codeword. For example, the codewords in the x-direction may be unique. However, to keep the codebook as small as possible (e.g., to reduce the number of codewords against which a detected codeword must be correlated to find a match), the codewords in the vertical direction need not be unique. For instance, after defining a codebook with just enough unique codewords to span the x-direction of the code layer or code mask, the codewords may be repeated in the y-direction. This is because depth information is obtained (as illustrated in FIG. 3) from the codewords perceived/captured in one direction (x-direction). Consequently, having unique codewords in the transverse direction (y-direction) is not necessary. Also, the width of the composite code mask 1102 may be selected depending on the distance the distance range at which the object or scene of interest is located (e.g., the width of composite code mask may be sufficiently wide to capture the object or scene of interest in a single projection) and also to avoid aliasing (e.g., where the composite code mask reuses codewords, the composite code mask should be sufficiently wide to avoid erroneous detection of reused codewords).

In an alternative implementation, where the transmitter and receiver may be setup on the same vertical plane. In this example, the codewords in the y-direction may be unique and the codewords in the x-direction may be repeating.

In one example, the binary symbols in the code layer 1106 may be pseudorandomly arranged so as to achieve unique codewords in at least one direction (e.g., x-direction). In another example, the binary symbols may be arranged so as to maximize the Hamming distance of the codewords represented by each window. This allows for error correction in a detected/captured codeword by selecting the closest codeword based on Hamming distance.

The codewords (as perceived by an optical receiver) may serve to represent depth information for an object (or parts of an object) and are transmitted along with the image of the object as part of an image file. For instance, for an M×N image, an image file 1104 may include 2-dimensional image information along with depth information (e.g., generated from detected codewords) for segments/portions of the image. For example, each codeword may be generated into a depth to represent a p1×p2 pixel window of the 2-dimensional image.

FIGS. 12, 13, 14, and 15 illustrate various examples of composite code masks.

Figure 12:
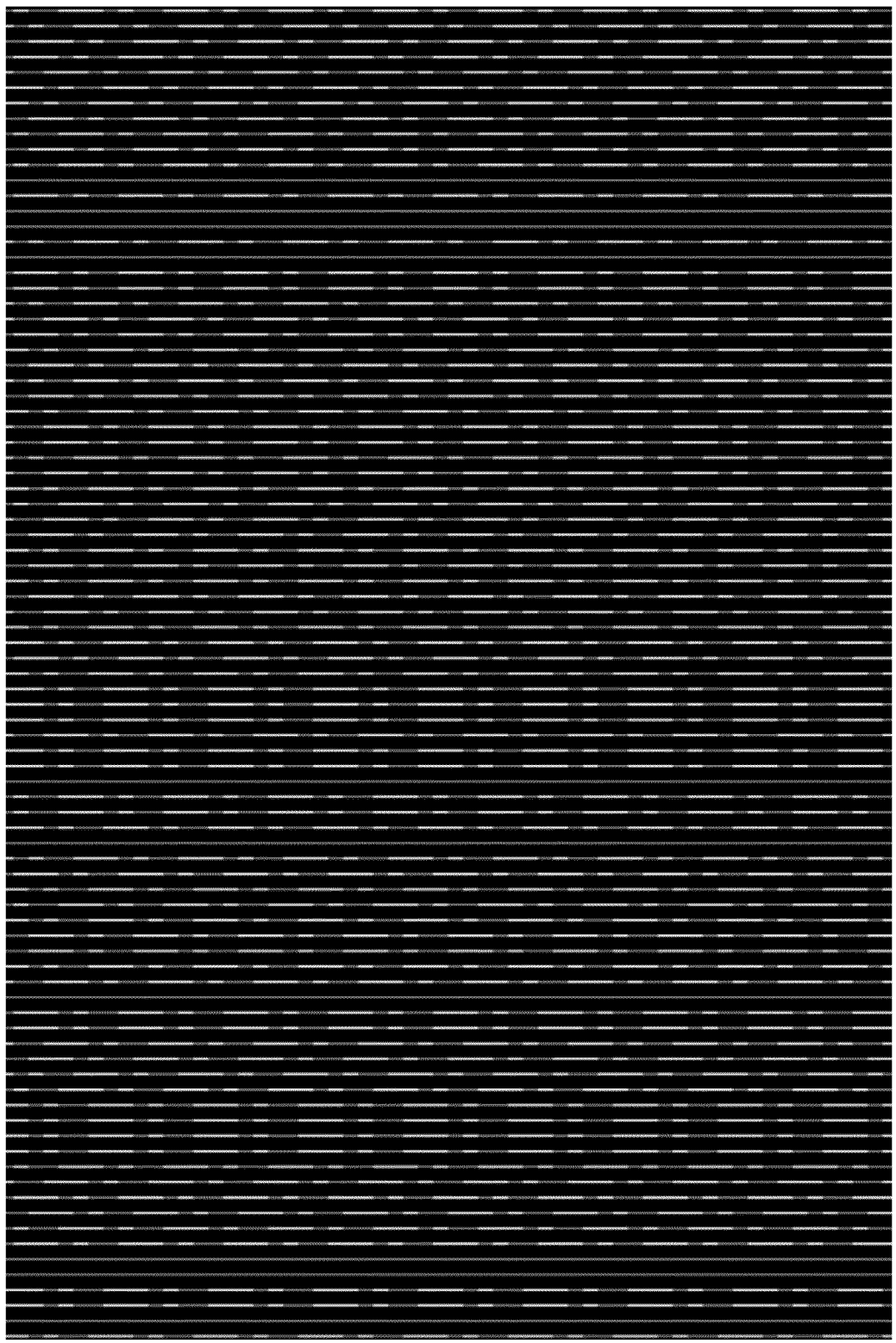
FIG. 12 illustrates a first composite code mask that uses three gray-scale levels (e.g., black, white, and a gray).

FIG. 12 illustrates a first composite code mask 1200 that uses three gray-scale levels (e.g., black, white, and a gray). In this example, black is used for the guard interval and white/gray are used for the code/reference stripes.

Figure 13:
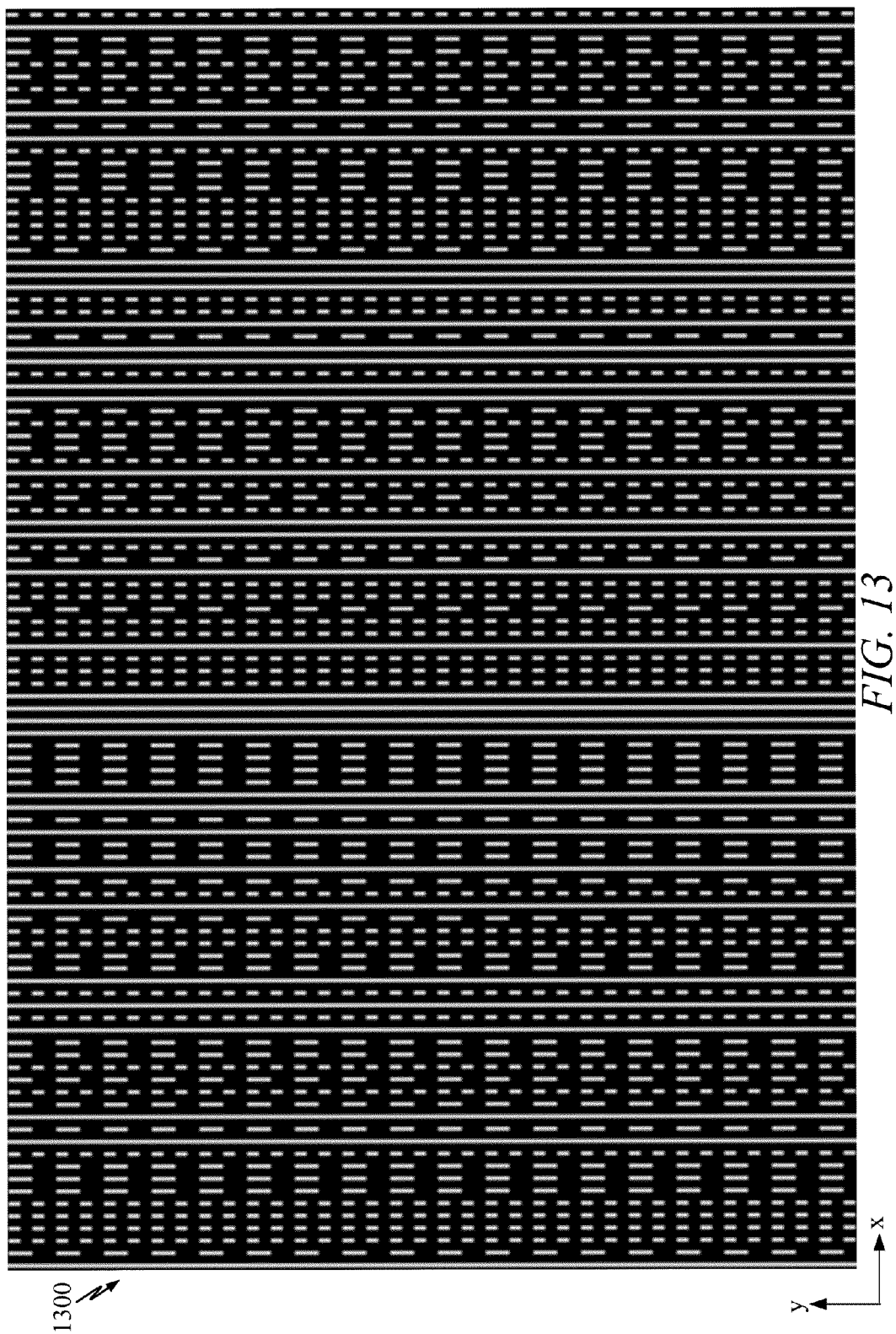
FIG. 13 illustrates a second composite code mask that uses two gray-scale levels (e.g., black and white).

FIG. 13 illustrates a second composite code mask 1300 that uses two gray-scale levels (e.g., black and white). In this example, black is used for the guard interval and white/black are used for coding/reference stripes. Thus, the reference stripes are detectable from the presence of white stripes used for coding (e.g., codewords).

Figure 14:
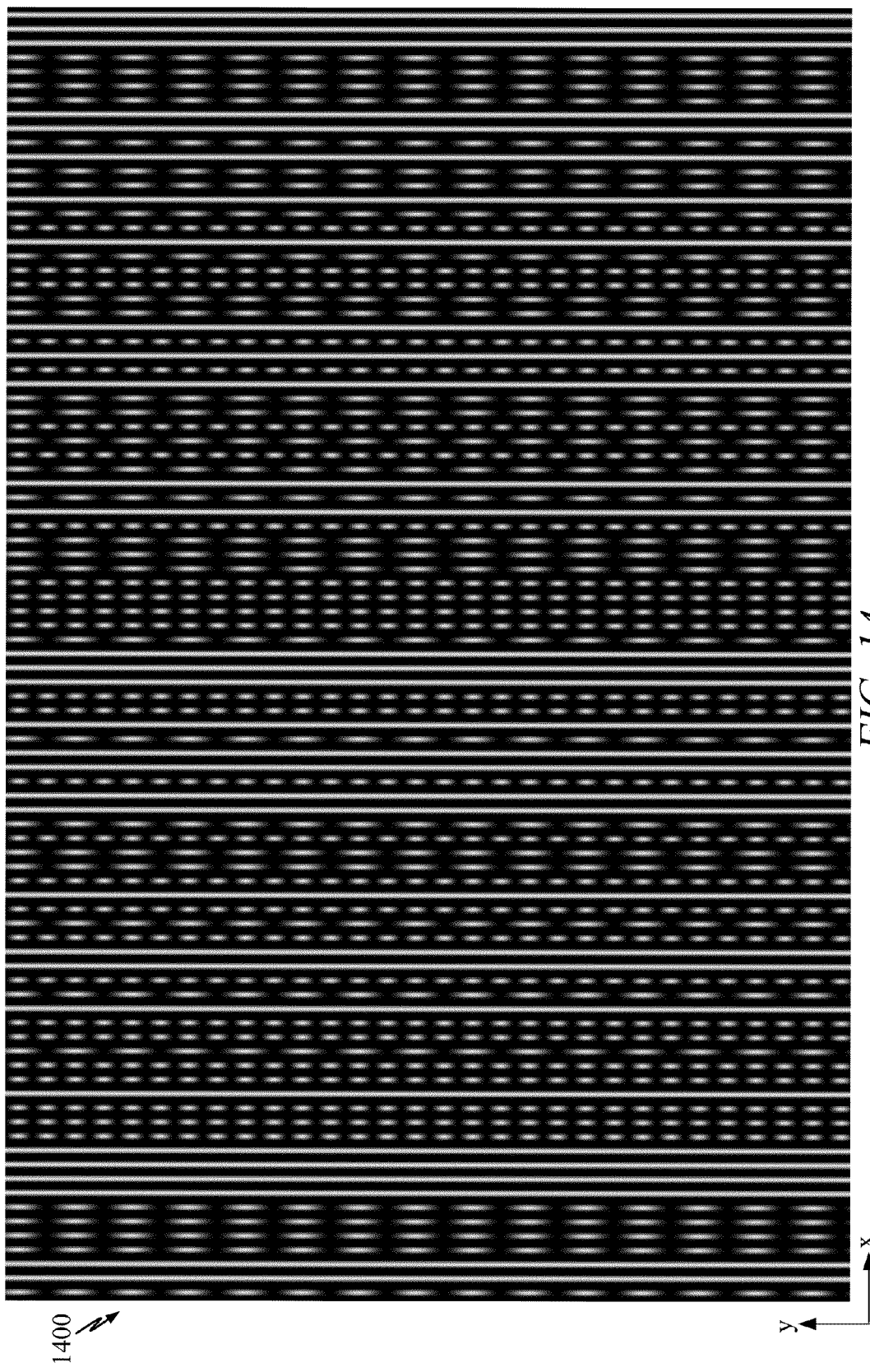
FIG. 14 illustrates a third composite code mask that uses two gray-scale levels (e.g., black and white) with sinusoidal shaping.

FIG. 14 illustrates a third composite code mask 1400 that uses two gray-scale levels (e.g., black and white) with sinusoidal shaping. In this example, black is used for the guard interval and white/black are used for coding/reference stripes. Thus, the reference stripes are detectable from the presence of white stripes used for coding (e.g., codewords). The sinusoidal shaping may serve to pre-distort elements of the composite code mask 1400. In this example, such pre-distortion of the composite code mask has resulted in the blurring and rounding of the code stripes. Such pre-distortion may serve to compensate for environmental and/or object surface distortions, thereby improving detection of codewords in the projected composite code mask by a receiver.

Figure 15:
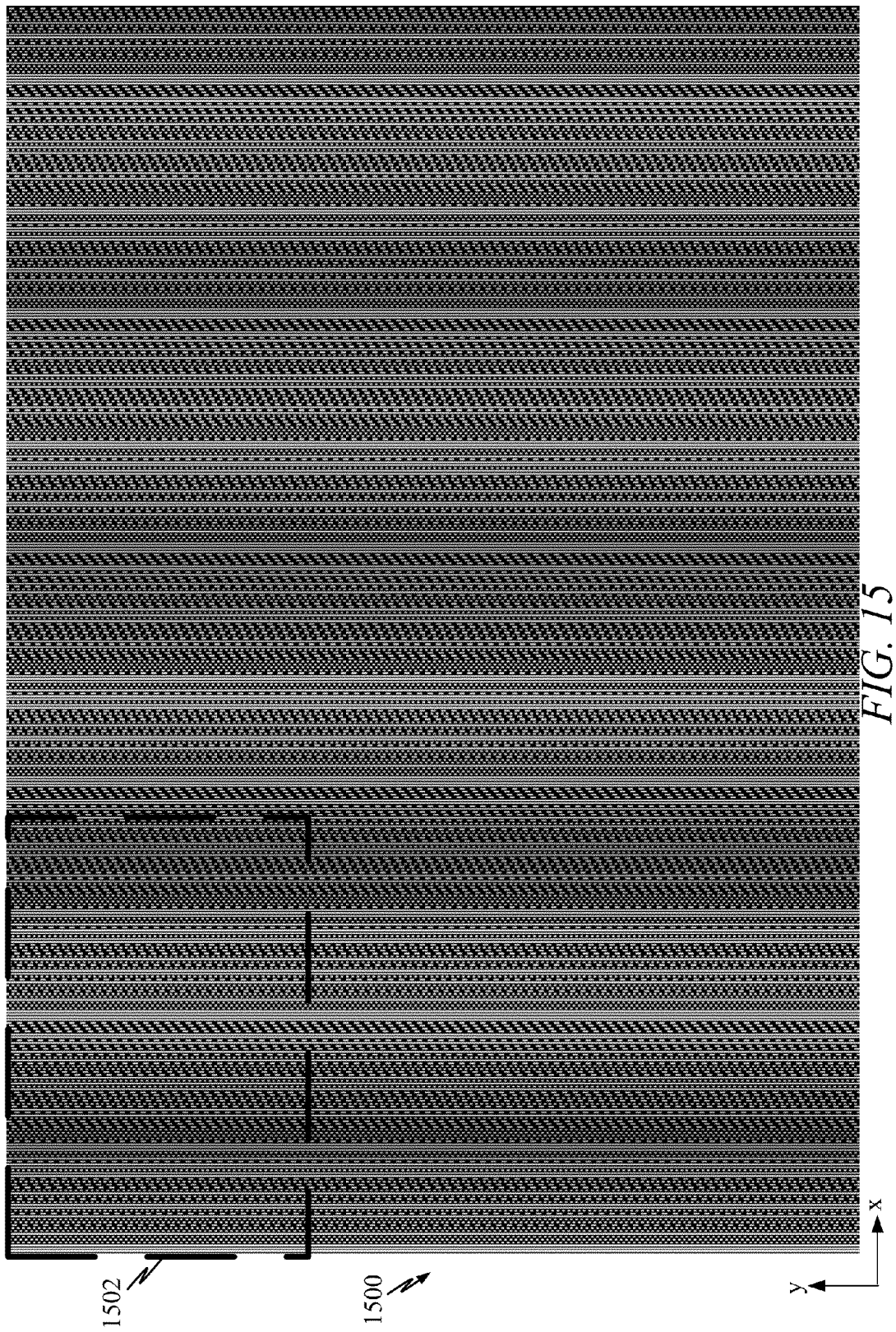
FIG. 15 illustrates a fourth composite code mask that uses two gray-scale levels (e.g., black and white).

FIG. 15 illustrates a fourth composite code mask that uses two gray-scale levels (e.g., black and white). In this example, black is used for the guard interval and white/black are used for coding/reference stripes. In this example, the code stripes are only aligned along the x axis, but staggered along the y axis.

Figure 16:
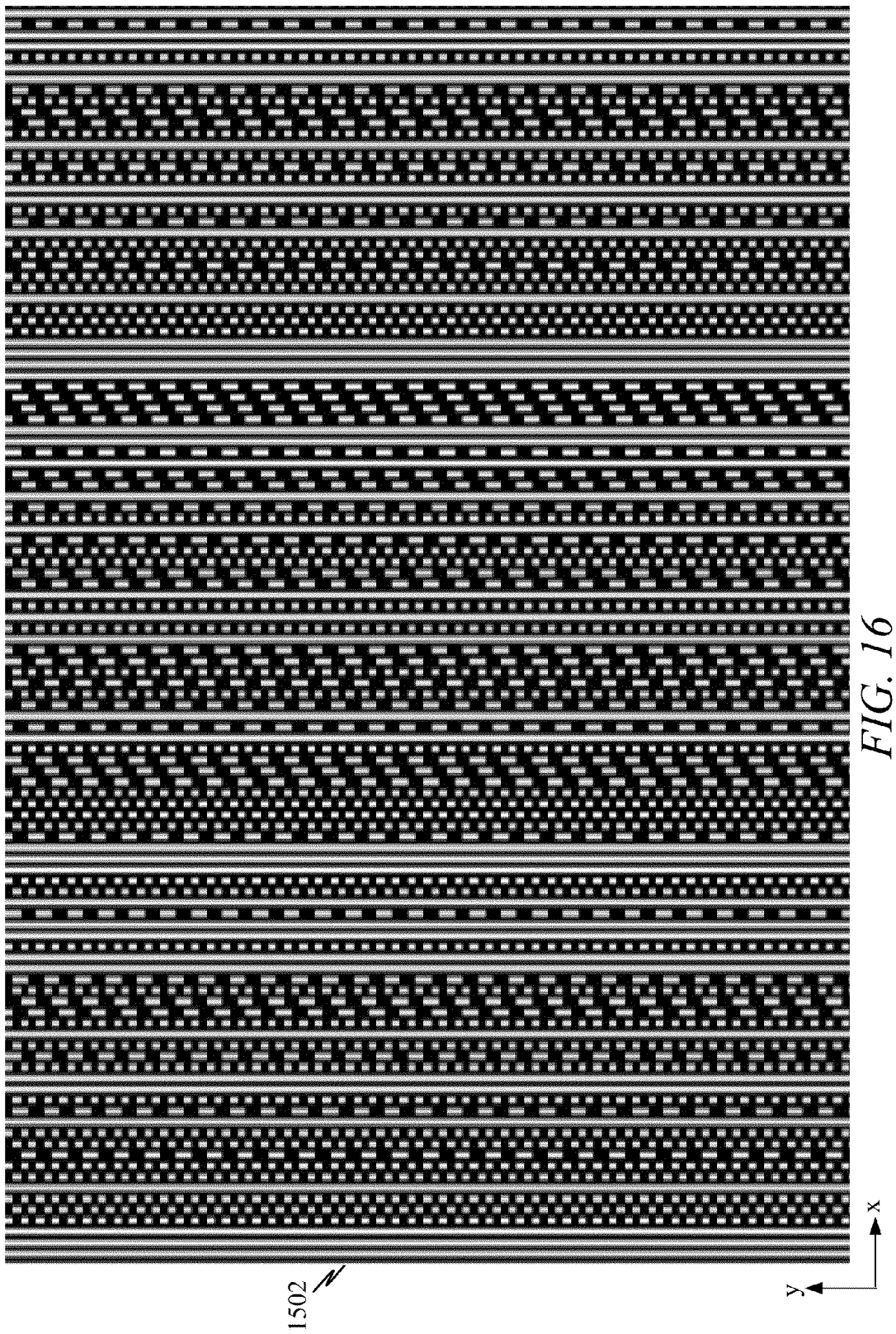
FIG. 16 illustrates a portion of the fourth composite code mask in FIG. 15.

FIG. 16 illustrates a portion 1502 of the fourth composite code mask 1500 in FIG. 15. It can be appreciated here that the code stripes are staggered along the y axis. Staggering the code stripes means that the stripes used to define codewords are not aligned in both the x-axis and y-axis. As can be perceived from FIG. 13, for example, there is an alignment of the white stripes (used for coding) along the x-axis and y-axis (e.g., where the top of the white stripes align even when the white stripes are of varying lengths). By contrast, in FIG. 16 the white stripes (used for coding) only align along one axis (e.g., x-axis) but not in the second axis (y-axis) (e.g., neither the top or bottom of the white stripes are aligned, instead they are staggered across at least a portion of the codemask).

Without staggering, there is a probability that when a code mask is projected onto on object with angular surfaces, distortions may cause different portions (e.g., non-adjacent portions, separate portions, etc.) of the codemask to be erroneously captured as a codeword. By contrast, the probability of such erroneous or unintended codeword being detected is significantly reduced by staggering the white stripes. That is, the alternative mask of FIGS. 15 and 16 arranges the stripes so that they are staggered in at least one dimension or axis, making it less likely that an erroneous or unintended codeword will be detected.

Figure 17:
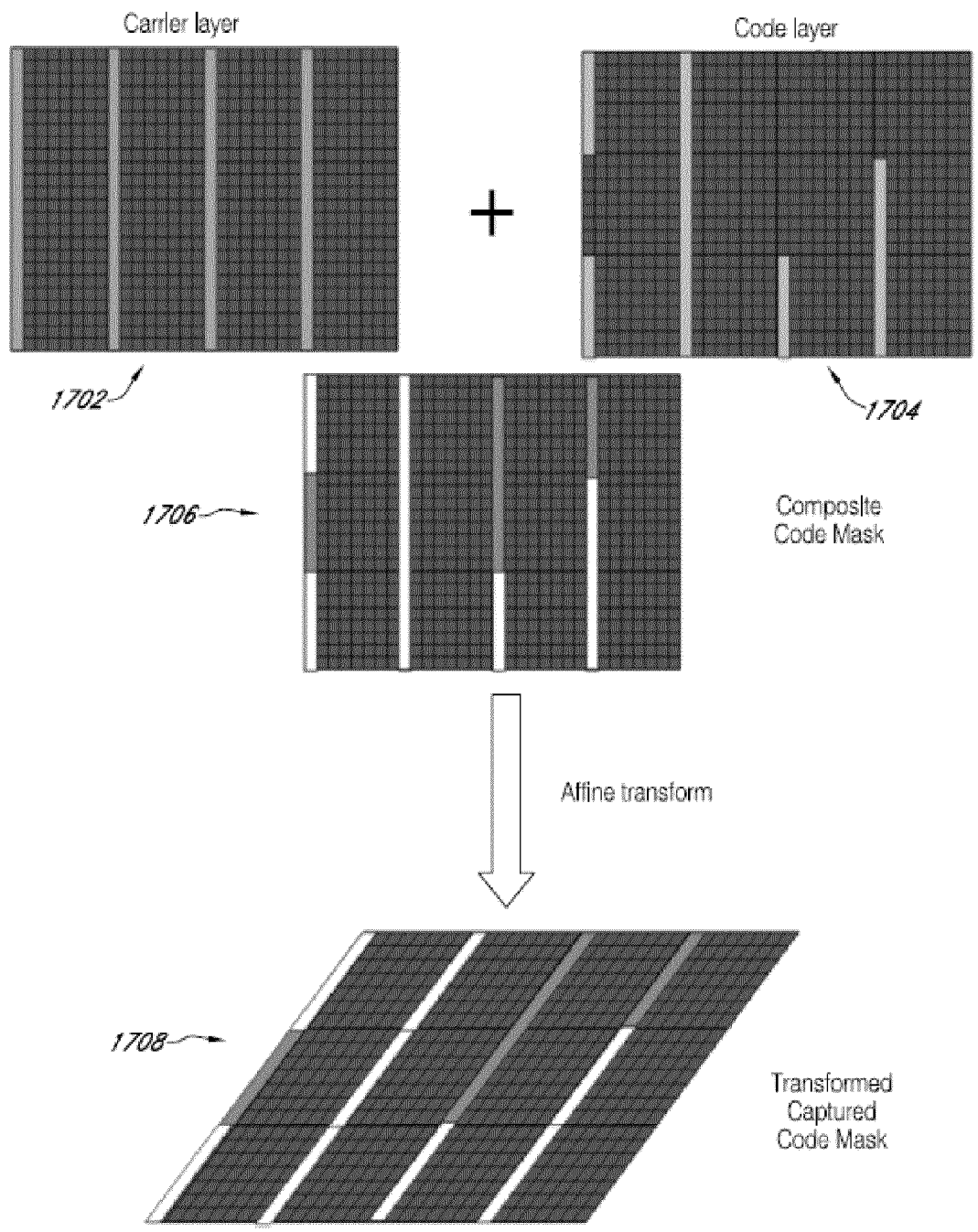
FIG. 17 illustrates the combination of a carrier layer and a code layer and transformation of the composite code mask.

FIG. 17 illustrates the combination of a carrier layer and a code layer and transformation of the composite code mask. A carrier layer 1702 is combined or superimposed on a code layer 1704 to obtain a composite code mask 1706. As a result of its projection on an uneven or angled surface, the composite code mask 1706 may be transformed into a captured code mask 1708.

Figure 18:
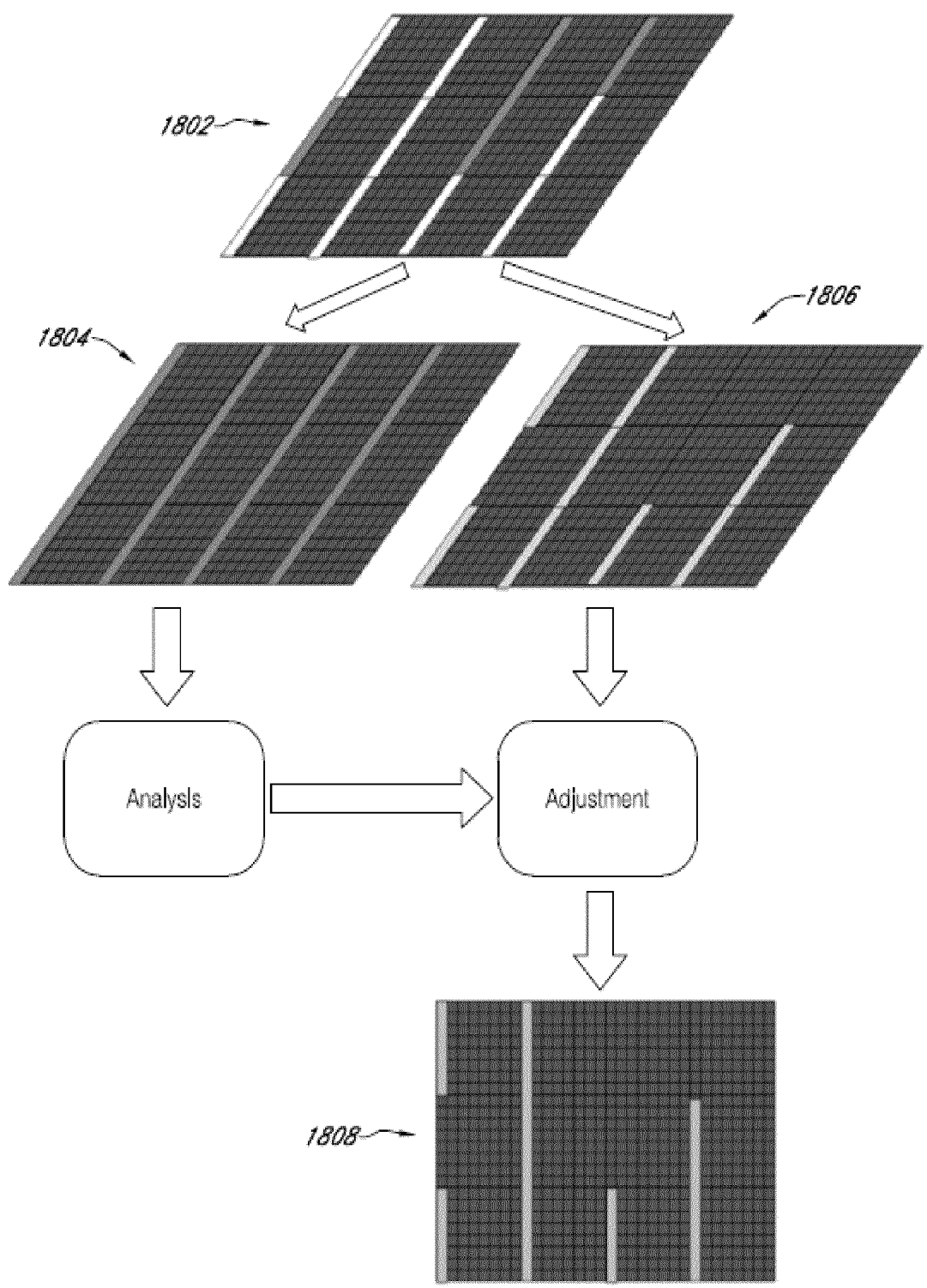
FIG. 18 illustrates the decomposition of a received code mask and alignment or adjustment of the received code mask to obtain the original code layer.

FIG. 18 illustrates the decomposition of a received code mask and alignment or adjustment of the received code mask to obtain the original code layer. The received code mask 1802 may be transformed so that it is misaligned relative to the original code mask. However, because a known carrier layer was used, the received code mask 1802 can be decomposed into a received carrier layer 1804 and a received code layer 1806. The affine transformation of the received carrier layer 1804 may be analyzed and/or ascertained by comparing it to the original carrier layer (1702 in FIG. 17). Having identified the affine transformation of the carrier layer in this manner, the received code layer 1806 can be adjusted to obtain an adjusted code layer 1808 that substantially matches the original code layer (1704 in FIG. 17).

Figure 19:
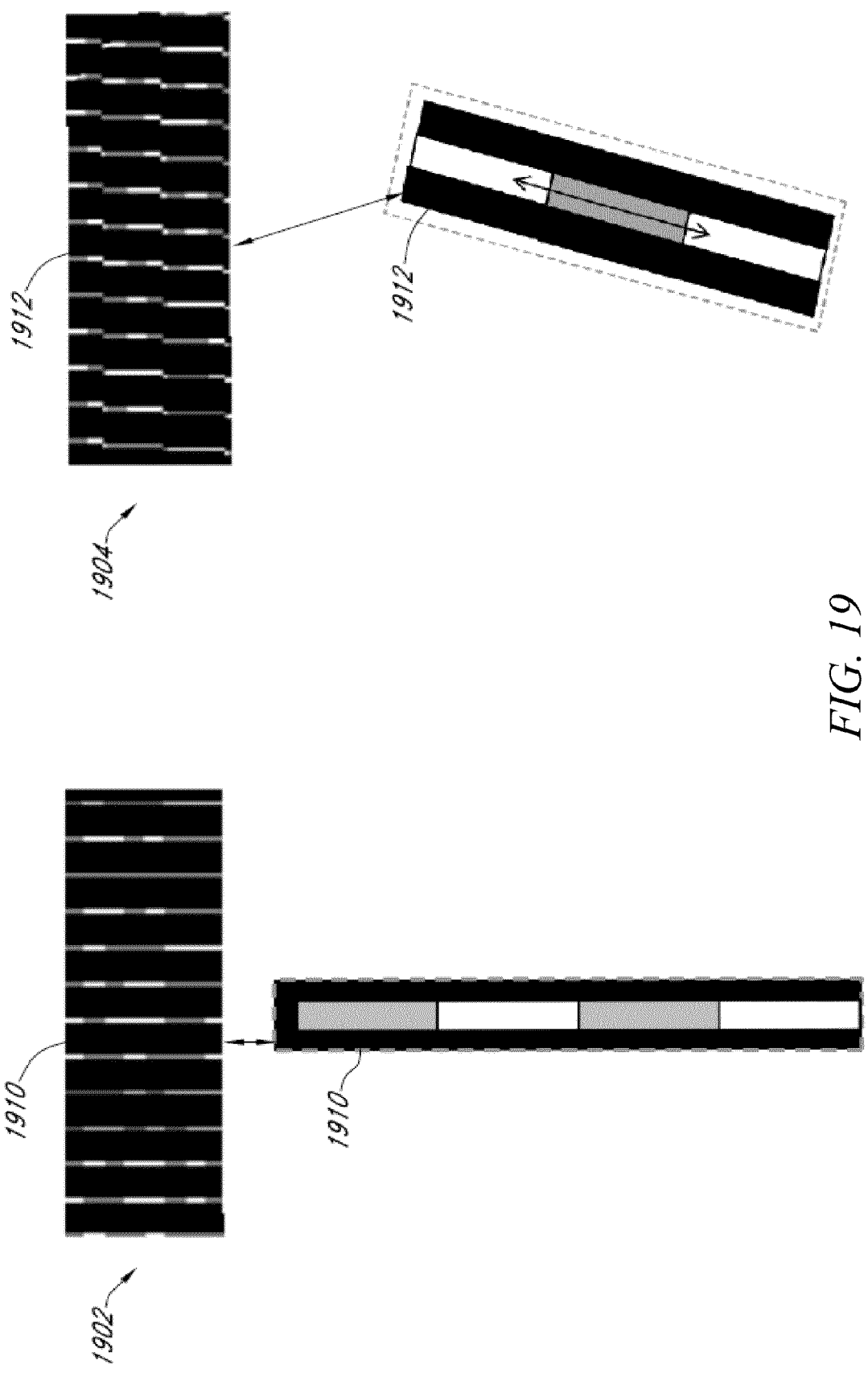
FIG. 19 illustrates an example of how a transmitted code mask may be projected on a surface that causes the received code mask to be transformed or distorted.

FIG. 19 illustrates an example of how a transmitted code mask 1902 may be projected on a surface that causes the received code mask 1904 to be transformed or distorted. As can be appreciated, the reference stripes 1910 and 1912 in code masks 1902 and 1904 may serve to align the received code mask 1904.

Figure 20:
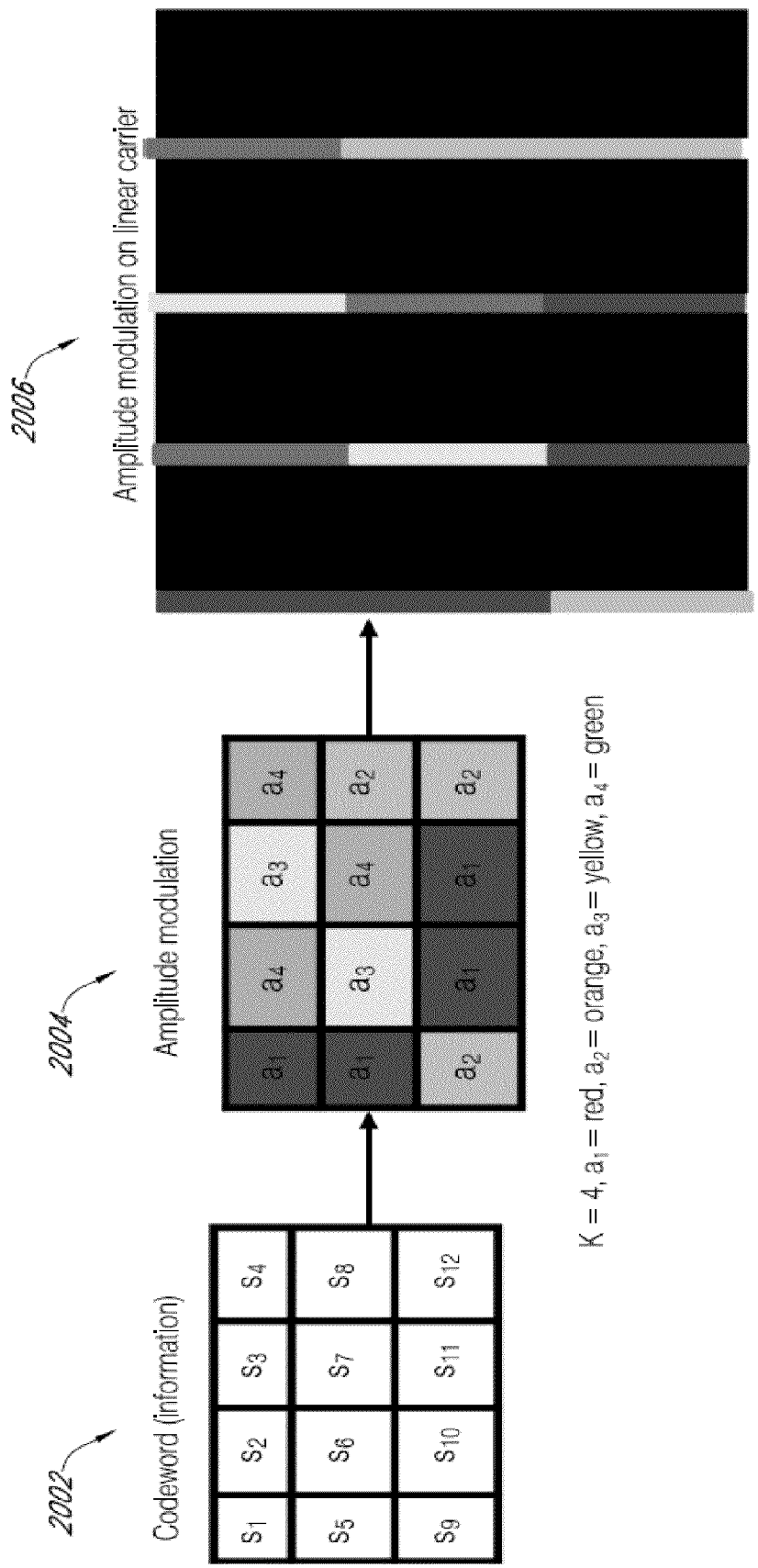
FIG. 20 illustrates an example of how the spatial coding example of FIG. 9 may be further broadened to include spatial amplitude modulation.

FIG. 20 illustrates an example of how the spatial coding example of FIG. 9 may be further broadened to include spatial amplitude modulation. A codeword 2002 is defined by a plurality of symbols within a window (e.g., 3×4 symbol window). Each symbol $s_k$ may be distinguishable from other symbols by using amplitude modulation according to different intensity levels (e.g., gray-scale levels or colors). Here, the intensity levels are represented by different colors. Thus, the amplitude modulated codeword 2004 illustrates a codeword made up from four (4) types of symbols (a1, a2, a3, a4). The resulting codeword mask 2006 illustrates how the amplitude modulated codeword 2004 is mapped onto a linear carrier with guard bands. Note that the carrier can also be modulated by a shaping function to improve transmission and/or reception characteristics of the codeword.

Figure 21:
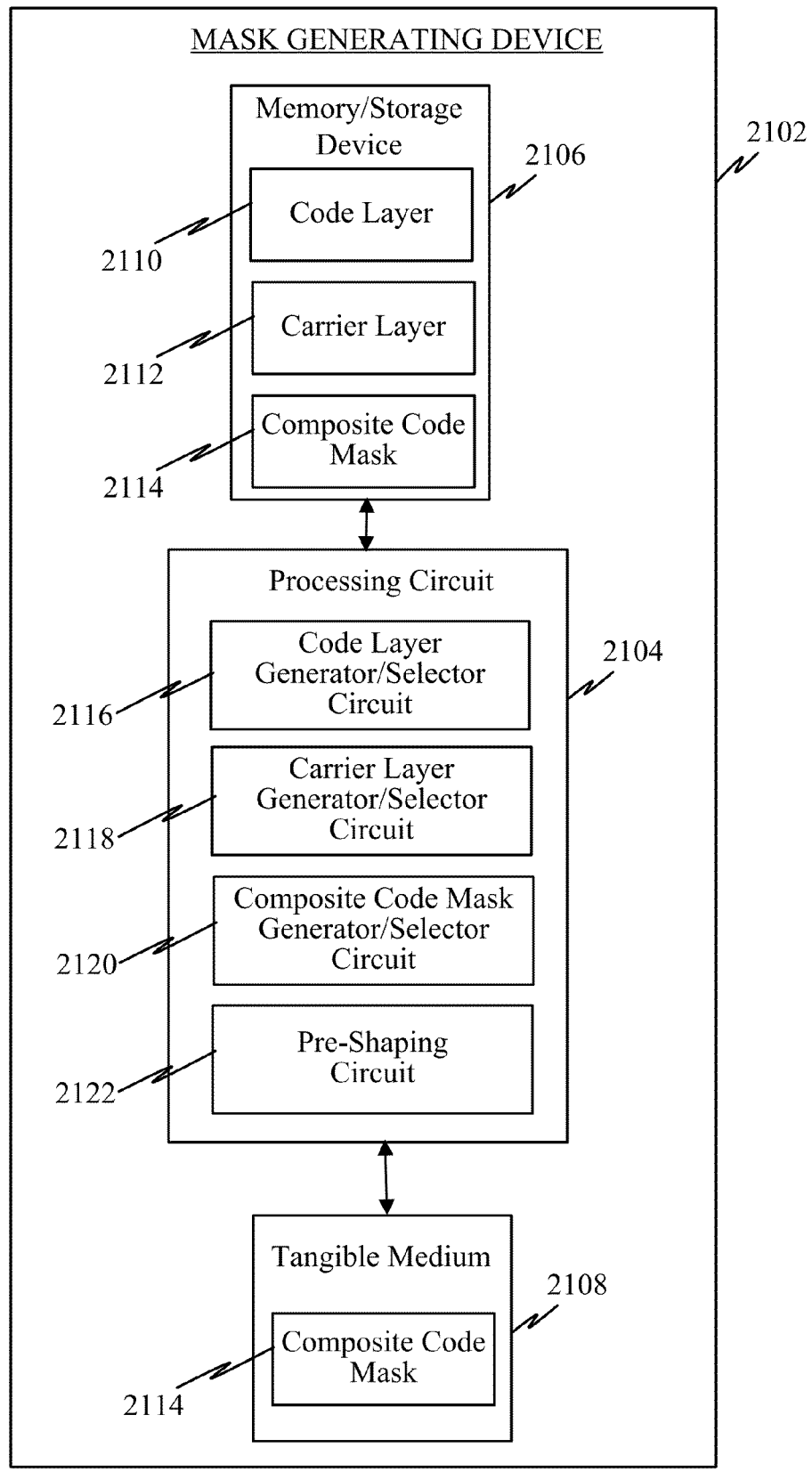
FIG. 21 is a block diagram illustrating a mask generating device for generating a composite mask code.

FIG. 21 is a block diagram illustrating a mask generating device for generating a composite mask code. The mask generating device 2102 may include a processing circuit 2104 that implements a code layer generator/selector circuit 2116, a carrier layer generator/selector circuit 2118, a composite code mask generator/selector circuit 2120, and/or a pre-shaping circuit 2122. The processing circuit 2104 may be coupled to a memory store memory/storage device 2106 and/or a tangible medium 2108.

The code layer generator/selector circuit 2116 may be configured/adapted to generate a code layer (e.g., FIGS. 11A, 11B, FIG. 20, etc.) and/or select a pre-generated code layer (e.g., stored in the memory/storage device 2110). The carrier layer generator/selector circuit 2118 may be configured/adapted to generate carrier layer (e.g., FIG. 9, FIG. 20, etc.) and/or select a pre-generated carrier layer (e.g., stored in the memory/storage device 2112). The composite code mask generator/selector circuit 2120 may be configured/adapted to generate a composite code mask by combining the code layer and carrier layer and storing the composite code mask 2114 in the memory/storage device 2106 and/or the tangible medium 2108 (e.g., film, digital data storage device, etc.). Additionally, the pre-shaping circuit 2122 may be adapted to pre-shape at least one of the code layer and carrier layer to compensate for anticipated or expected channel distortions (e.g., where the channel includes the path and/or trajectory through which the composite code mask is to be projected).

Figure 22:
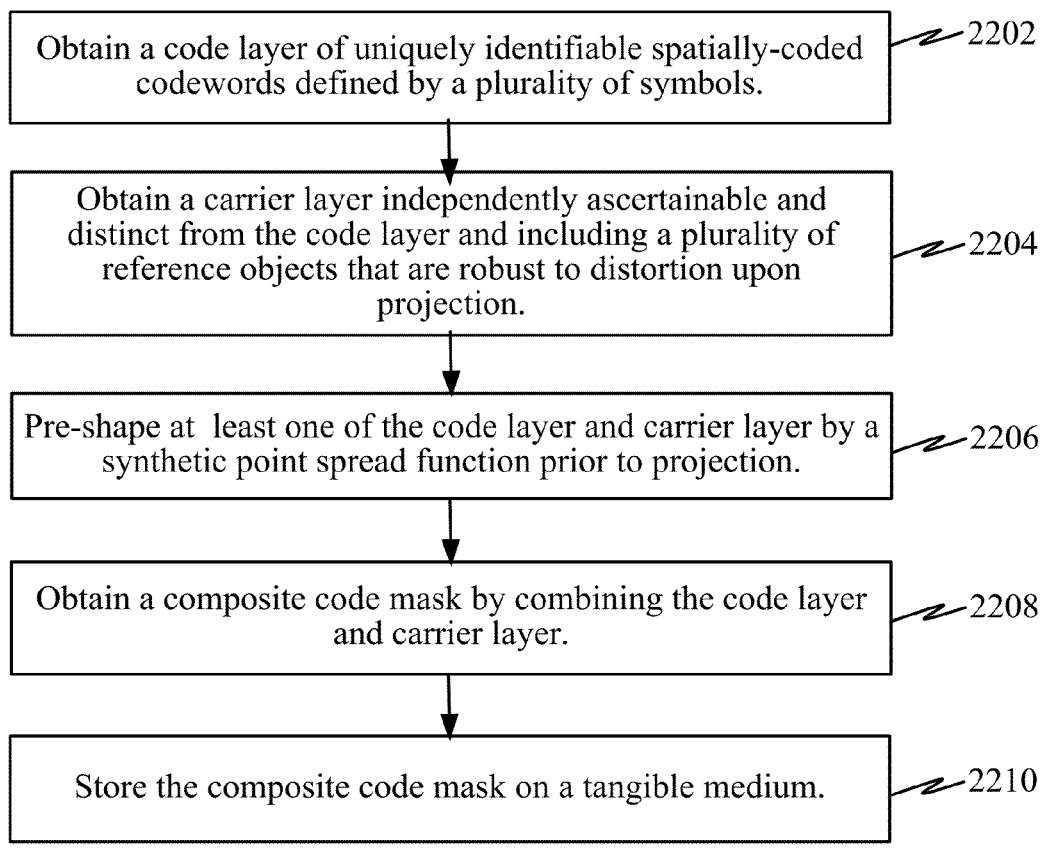
FIG. 22 illustrates an example of how to generate a composite code mask that is resistant to affine transformation.

FIG. 22 illustrates an example of how to generate a composite code mask that is resistant to affine transformation. A code layer of uniquely identifiable spatially-coded codewords defined by a plurality of symbols is obtained 2202. For example, a code layer may comprise a plurality of symbols or graphics (e.g., n1 symbols×n2 symbols) as in code layer 804 (FIG. 8). In one example, the code layer may comprise n1 by n2 binary symbols, where n1 and n2 are integers greater than two. In some implementations, the symbols or graphics may be line segments in two gray-scale shades (e.g., white and gray, white and black, etc.) with each of the two gray-scale shades representing "0" or "1" (as in FIG. 9). In one example, the symbols of the code layer may be staggered in at least one dimension. Each codeword may be defined by a window on the code layer that is k1 symbols by k2 symbols, where k1 and k2 are integers greater than two. Overlapping windows along at least one direction on the code layer may define different unique codewords from any other window along the same row or column. That is, each k1×k2 window may appear only once in the code layer along a particular direction (e.g., along columns or rows).

A carrier layer independently ascertainable and distinct from the code layer and including a plurality of reference objects that are robust to distortion upon projection is also obtained 2204. The reference stripes of the carrier layer may be equally spaced with a guard interval in between. Additionally, the guard interval width relative to a reference stripe width may be determined by an expected optical spreading. In some examples, the reference stripes may be of different widths (e.g., wider or narrower) than the guard interval. Such expected optical spreading may be determined based on the resolution and/or power of the light source being used to project the composite code mask, the distance to the object of interest, and/or receiver resolution, for example.

Optionally, at least one of the code layer and carrier layer may be pre-shaped by a synthetic point spread function prior to projection 2206. In one example, pre-shaping at least one of the code layer and carrier layer by a synthetic point spread function prior to projection may include: (a) ascertaining one or more conditions for a channel through which the code mask is to be projected, (b) obtaining the synthetic point spread function, based on the one or more conditions, to compensate for the distortions caused by the channel, and/or (c) applying the synthetic point spread function to the at least one of the code layer and the carrier layer. In another example, pre-shaping at least one of the code layer and carrier layer by a synthetic point spread function prior to projection may include: (a) obtaining a pre-shaping layer that compensates for distortions in a channel through which the code mask is to be projected; and/or (b) combining the pre-shaping layer as part of the composite mask. In yet other implementations, a transmitter device dynamically may perform the pre-shaping of the at least one of the code layer and carrier layer and combines the code layer and carrier layer to obtain the composite code mask.

A composite code mask is then obtained/generated by combining the code layer and carrier layer 2208. For instance, combining the code layer and carrier layer may include overlaying/superimposing the carrier layer over the code layer such that the code layer symbols appear within the reference stripes of the carrier layer. That is, the code layer symbols may serve to define the location of reference stripes. A receiver device may locate the symbols (e.g., coding stripes) in one or more gray-scale levels (distinct from the guard interval) thereby allowing a receiver device to separate or distinguish the code layer from the carrier layer. The carrier layer may permit a receiver to decode the composite code mask under affine transformation. Note that, in some implementations, the composite code mask may be generated beforehand and/or offsite and provided to a transmitter device. In some instances, various different code masks (e.g., with different codewords, configured for different distances, etc.) may be generated and provided to a transmitter device. In other implementations, the composite code mask may be dynamically generated at the transmitter device by selectively combining a carrier layer (from one or more available carrier layers) and a code layer (from one or more available code layers).

The composite code mask may then be stored on a tangible medium 2210. In various implementations, the composite code mask may be stored in a film medium that can be projected or it may be stored in digital form which transferred to a digitally configurable medium (e.g., translucent LCD screen).

In various examples, the tangible medium may include at least one of (a) a single film medium embodying the composite code mask, (b) a first file medium storing the code layer and a second film medium storing the carrier layer, (c) a digital storage device in which the composite code mask stored, and/or (d) a digital storage device in which the code layer and carrier layer are stored.

Subsequently, at least a portion of the composite code layer may be projected onto an object to help ascertain depth information for the object. For instance, a transmitter may use a light to project the composite code layer onto the surface of the object. The composite code mask may also be rendered as an image and stored for subsequent projection on the object.

In some implementations, where the transmitter may be on the same horizontal reference plane as the receiver, the reference stripes may be in a vertical orientation relative to the reference plane. In other implementations, where the transmitter may be on the same vertical reference plane as the receiver, the reference stripes may be in a horizontal orientation relative to the reference plane.

Figure 23:
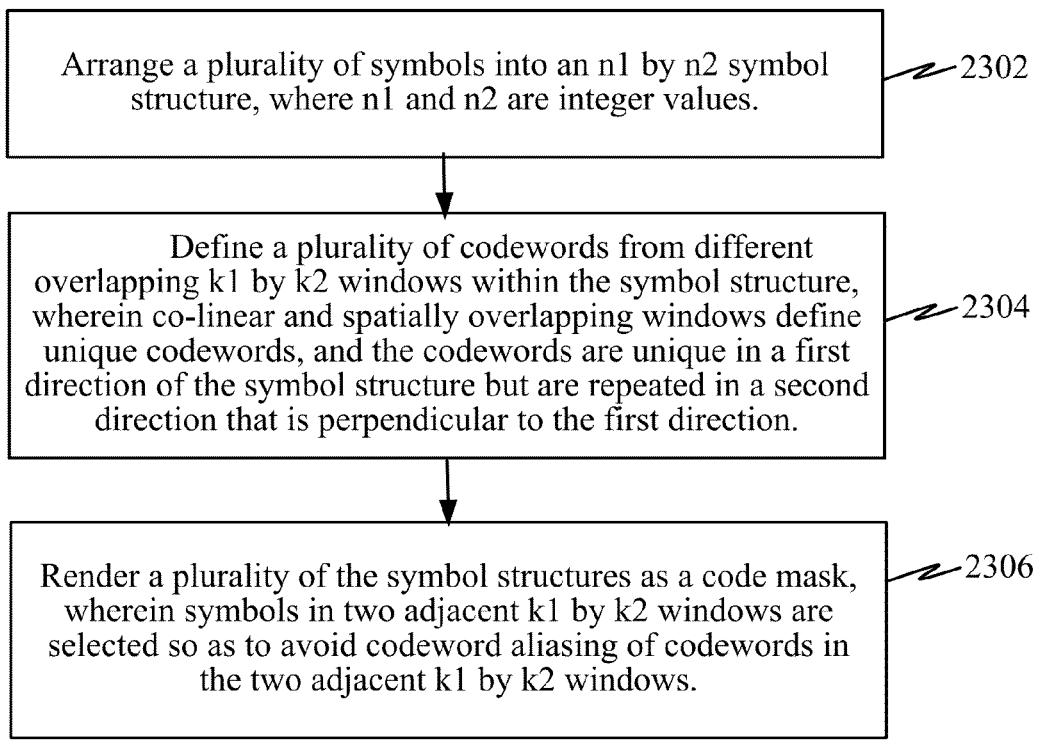
FIG. 23 illustrates an exemplary method for generating codewords and a composite code mask.

FIG. 23 illustrates an exemplary method for generating codewords and a composite code mask. A plurality of symbols may be arranged into an n1 by n2 symbol structure, where n1 and n2 are integer values 2302. A plurality of codewords may be defined from different overlapping k1 by k2 windows within the symbol structure, wherein co-linear and spatially overlapping windows define unique codewords, and the codewords are unique in a first direction of the symbol structure but are repeated in a second direction that is perpendicular to the first direction 2304.

A plurality of the symbol structures may be rendered as a code mask, wherein symbols in two adjacent k1 by k2 windows are selected so as to avoid codeword aliasing of codewords in the two adjacent k1 by k2 windows 2306. The code mask may include a code layer and an independent and distinct carrier layer, where the carrier layer includes a plurality of reference objects that are robust to distortion upon projection. The carrier layer reference objects may comprise a plurality of equally spaced reference stripes with a guard interval in between. Each reference stripe may be of different width than the guard interval. The width of each reference stripe relative to a guard interval width may be determined by an expected optical spreading of a transmitter device and/or a receiver device. The plurality of symbols of the code layer may be spatially staggered in at least one dimension. The different overlapping k1 by k2 windows may overlap in two dimensions.

Exemplary Transmitter Device

Figure 24:
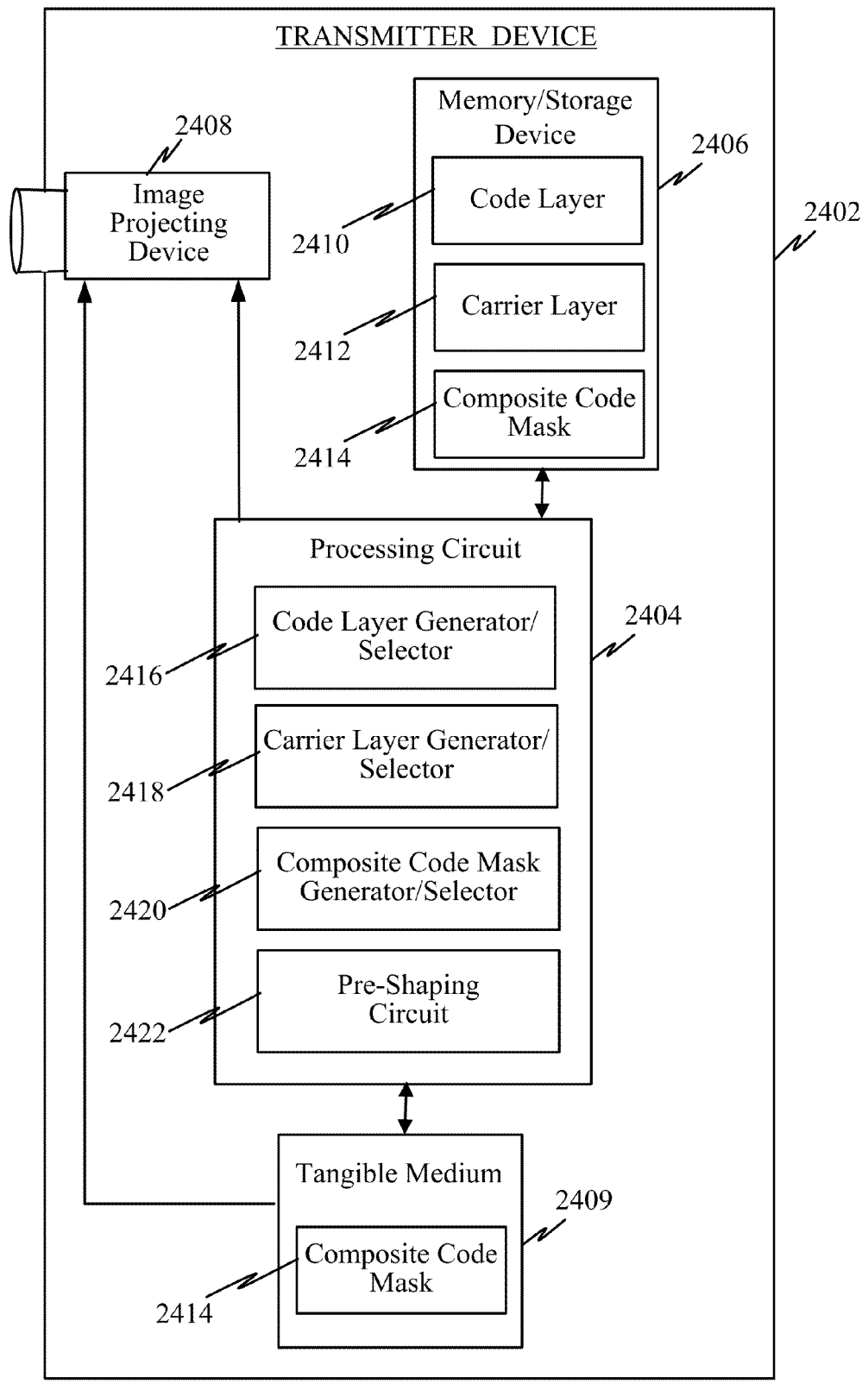
FIG. 24 is a block diagram illustrating an example of a transmitter device that may be configured to generate a composite code mask and/or project such composite code mask.

FIG. 24 is a block diagram illustrating an example of a transmitter device that may be configured to generate a composite code mask and/or project such composite code mask. The transmitter device 2402 may include a processing circuit 2404 coupled to a memory/storage device, an image projecting device 2408, and/or a tangible medium 2409.

In a first example, the transmitter device 2402 may be coupled or include a tangible medium 2409. The tangible medium may define, include, and/or store a composite code mask 2414, the composite code mask including a code layer combined with a carrier layer. The code layer may include uniquely identifiable spatially-coded codewords defined by a plurality of symbols. The carrier layer may be independently ascertainable and distinct from the code layer and includes a plurality of reference objects that are robust to distortion upon projection. At least one of the code layer and carrier layer may be pre-shaped by a synthetic point spread function prior to projection.

In a second example, the processing unit 2404 may include a code layer generator/selector 2416, a carrier layer generator/selector 2418, a composite code mask generator/selector 2420 and/or a pre-shaping circuit 2422. The code layer generator/selector 2416 may select a pre-stored code layer 2410 and/or may generate such code layer. The carrier layer generator/selector 2418 may select a pre-stored carrier layer 2412 and/or may generate such carrier layer. The composite code mask generator/selector may select a pre-stored composite code mask 2414 and/or may combine the code layer 2410 and carrier layer 2412 to generate the composite code mask 2414. Optionally, the processing circuit 2404 may include a pre-shaping circuit that pre-shapes the composite code mask 2414, the code layer 2410, and/or the carrier layer 2412, to compensate for expected distortion in the channel through which the composite code mask is to be projected.

In some implementations, a plurality of different code layers and/or carrier layers may be available, where each such carrier or code layers may be configured for different conditions (e.g., for objects at different distances, or different configurations between the transmitter device and receiver device). For instance, for objects within a first distance or range, a different combination of code and carrier layers may be used than for objects at a second distance or range, where the second distance is greater than the first distance. In another example, different combination of code and carrier layers may be used depending on the relative orientation of the transmitter device and receiver device.

The image projecting device 2408 may serve to project the generated/selected composite code mask onto an object of interest. For instance, a laser to other light source may be used to project the composite code mask onto the object of interest (e.g., through a projection channel). In one example, the composite code mask 2414 may be projected in an infrared spectrum, so it may not be visible to the naked eye. Instead, a receiver sensor in the infrared spectrum range may be used to capture such projected composite code mask.

Figure 25:
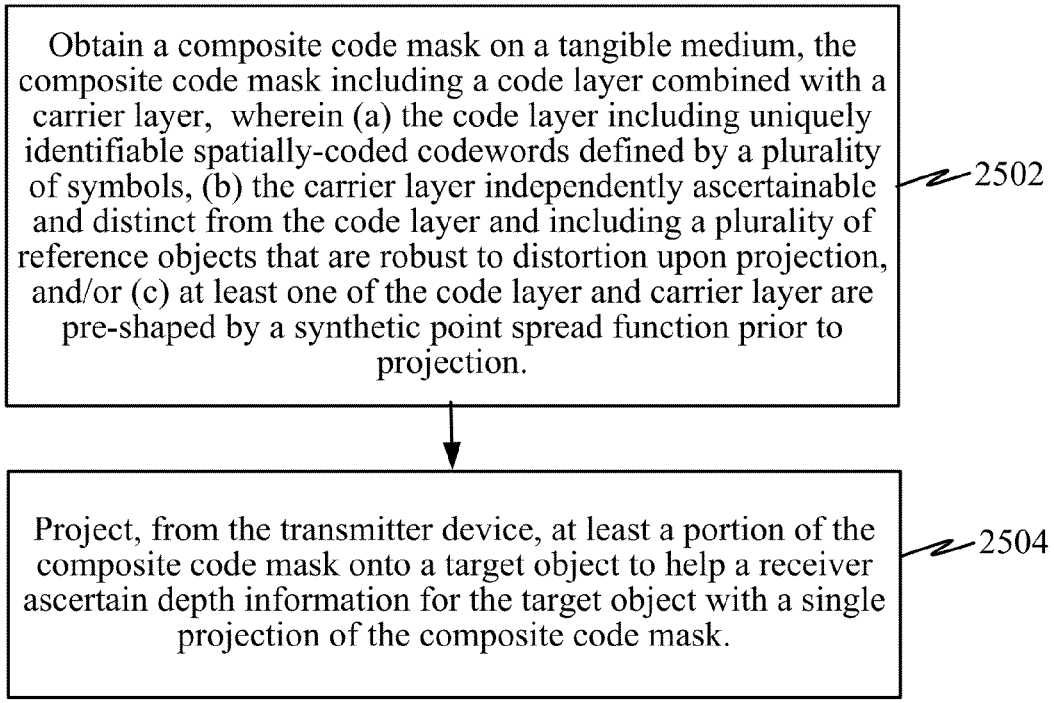
FIG. 25 illustrates a method for projecting a composite code mask.

FIG. 25 illustrates a method for projecting a composite code mask. A composite code mask on a tangible medium is obtained, the composite code mask including a code layer combined with a carrier layer, wherein (a) the code layer including uniquely identifiable spatially-coded codewords defined by a plurality of symbols, (b) the carrier layer independently ascertainable and distinct from the code layer and including a plurality of reference objects that are robust to distortion upon projection, and (c) at least one of the code layer and carrier layer are pre-shaped by a synthetic point spread function prior to projection 2502. The code layer may comprise n1 by n2 binary symbols, where n1 and n2 are integers greater than two.

The transmitter device may then project at least a portion of the composite code mask onto a target object to help a receiver ascertain depth information for the target object with a single projection of the composite code mask 2504.

In one example, overlapping windows along at least one direction on the code layer may define different unique codewords from any other window along the same row or column. Each symbol in the composite code mask may be a line segment in one of two gray-scale shades distinct from the reference objects. According to one aspect, the symbols of the code layer are staggered in at least one dimension. The carrier layer reference objects may comprise a plurality of equally spaced reference stripes with a guard interval in between. The reference stripes and the guard interval may be of different widths. The width of each reference stripe relative to a guard interval width may be determined by an expected optical spreading of a transmitter device and/or a receiver device. The code layer and carrier layer may be combined by overlaying the carrier layer over the code layer such that the code layer symbols appear within the reference stripes of the carrier layer.

In one example, the binary symbols may be oriented line segments. In one instance, the line segments in the code mask are oriented perpendicular to a plane in which a transmitter of the code mask and a receiver of the code mask are aligned. Because the transmitter and receiver are aligned in one plane (e.g., horizontal plane), the depth information is obtained from displacement of the codeword (as illustrated in FIG. 3) along one direction. Consequently, codeword uniqueness is only necessary along the direction of the displacement.

In order to keep the total number of codewords relatively small (e.g., to reduce the number of possible correlations needed to find a codeword match), the symbol structure may define a subset of codewords from a total possible number of codewords. Consequently, codewords may be unique in a first direction of the symbol structure but are repeated in a second direction that is perpendicular to the first direction.

In one example, each symbol is a line segment in one of two gray-scale shades having at least a 50% shade difference. In another example, each symbol is represented as a line segment in the code mask, and the line segments are parallel and/or co-linear with each other.

In one example, pre-shaping at least one of the code layer and carrier layer by a synthetic point spread function prior to projection includes: (a) ascertaining one or more conditions for a channel through which the code mask is to be projected, (b) obtaining the synthetic point spread function, based on the one or more conditions, to compensate for the distortions caused by the channel, and/or (c) applying the synthetic point spread function to the at least one of the code layer and the carrier layer. In another example, pre-shaping at least one of the code layer and carrier layer by a synthetic point spread function prior to projection includes: (a) obtaining a pre-shaping layer that compensates for distortions in a channel through which the code mask is to be projected, and/or (b) combining the pre-shaping layer as part of the composite mask.

Exemplary Receiver Device Operation

Figure 26:
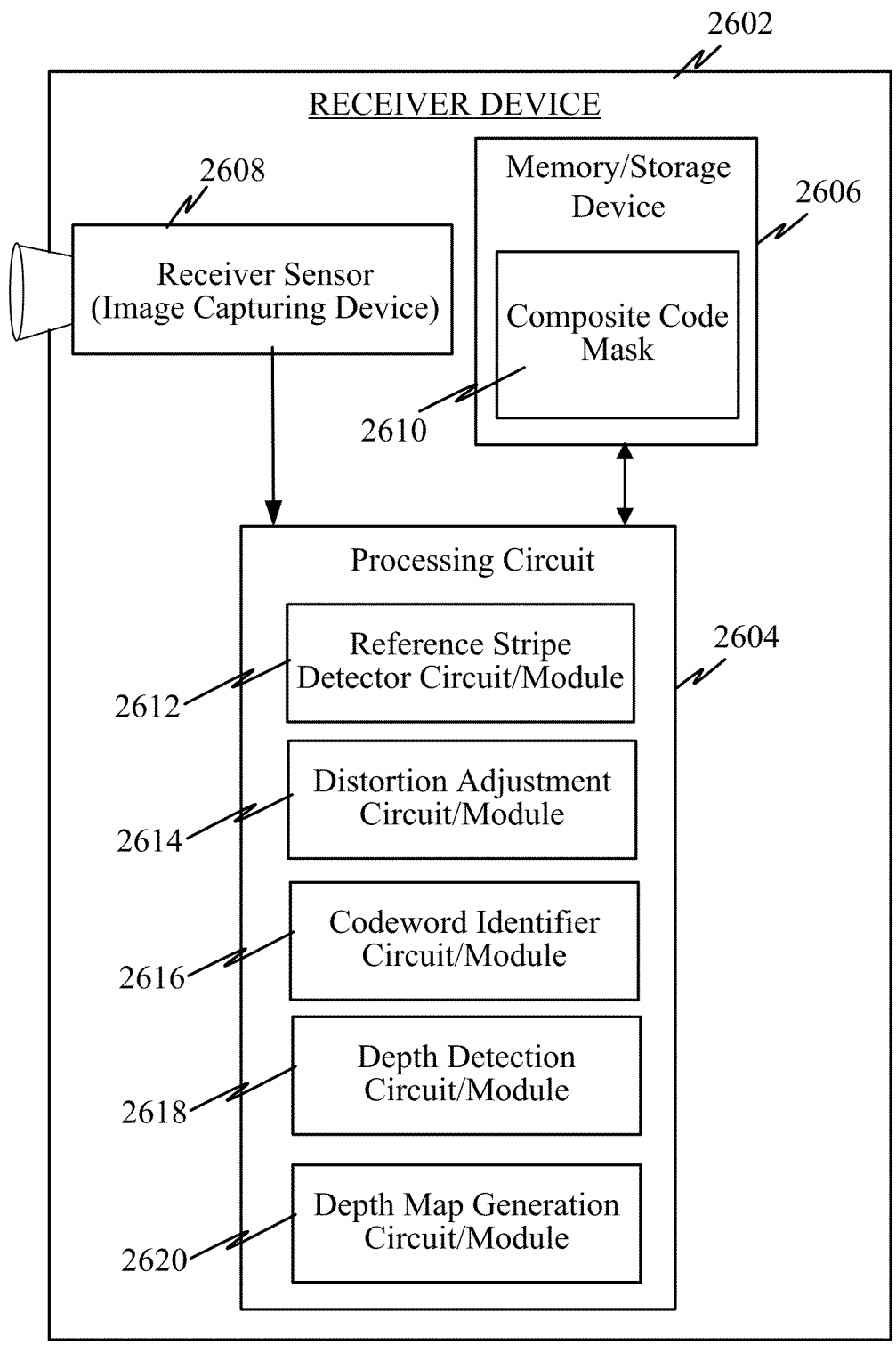
FIG. 26 is a block diagram illustrating an example of a receiver device that may be configured to obtain depth information from a composite code mask.

FIG. 26 is a block diagram illustrating an example of a receiver device that may be configured to obtain depth information from a composite code mask. The receiver device 2602 may include a processing circuit 2604 coupled to a memory/storage device and a receiver sensor 2608 (e.g., an image capturing device 2608).

The receiver sensor 2608 (e.g., camera, etc.) may serve to obtain at least a portion of a composite code mask projected on the surface of an object. For instance, the receiver sensor may capture at least a portion of a composite code mask projected on the surface of a target object. The composite code mask may be defined by: (a) a code layer of uniquely identifiable spatially-coded codewords defined by a plurality of symbols, and (b) a carrier layer independently ascertainable and distinct from the code layer and including a plurality of reference objects that are robust to distortion upon projection. At least one of the code layer and carrier layer may have been pre-shaped by a synthetic point spread function prior to projection. In one example, the receiver sensor 2608 may capture the composite code mask in the infrared spectrum.

The code layer may comprise n1 by n2 binary symbols, where n1 and n2 are integers greater than two. In the composite code mask, each symbol may be a line segment in one of two gray-scale shades distinct from the reference objects. The symbols of the code layer may be staggered in at least one dimension. The carrier layer reference objects may comprise a plurality of equally spaced reference stripes with a guard interval in between. The reference stripes and the guard interval may be of different widths. The width of each reference stripe relative to a guard interval width may be determined by an expected optical spreading of a transmitter device and/or a receiver device.

The processing circuit 2604 may include a reference stripe detector circuit/module 2612, a distortion adjustment circuit/module 2614, a codeword identifier circuit/module 2616, a depth detection circuit/module 2618, and/or a depth map generation circuit/module 2620.

The reference stripe detector circuit/module 2612 may be configured to detect reference stripes within the portion of the composite code mask. The distortion adjustment circuit/module 2614 may be configured to adjust a distortion of the portion of the composite code mask based on an expected orientation of the reference stripes relative to an actual orientation of the reference stripes. The codeword identifier circuit/module 2616 may be configured to obtain a codeword from a window defined within the portion of the composite code mask. The depth detection circuit/module 2618 may be configured to obtain a depth information for a surface portion of the target object corresponding to the window based on: (a) a single projection of the composite code mask, and (b) a displacement of the window relative to a known reference code mask.

The depth map generation circuit/module 2620 may be configured to assemble a depth map for the object based on a plurality of codewords detected as different overlapping windows within the portion of the undistorted composite code mask.

In one example, pre-shaping of at least one of the code layer and carrier layer increases power efficiency during the projection of the composite code mask, such that more power is perceived by a receiver sensor in comparison to an unshaped composite code mask.

In one instance, the synthetic point spread function used may be selected from a plurality of point spread functions based on at least one of: (a) expected channel conditions through which the composite code mask is to be projected, (b) characteristics of surfaces onto which the composite code mask is projected, and/or (c) a sensitivity of the receiver sensor which is to receive the projected composite code mask. In another example, the synthetic point spread function may be selected from a plurality of point spread functions based on at least one of: (a) a first channel response for a projector that is to project the composite code mask; and/or (b) a second channel response for a path from a projector, that is to project the composite code mask, to the receiver sensor, that is to receive the composite code mask.

Figure 27:
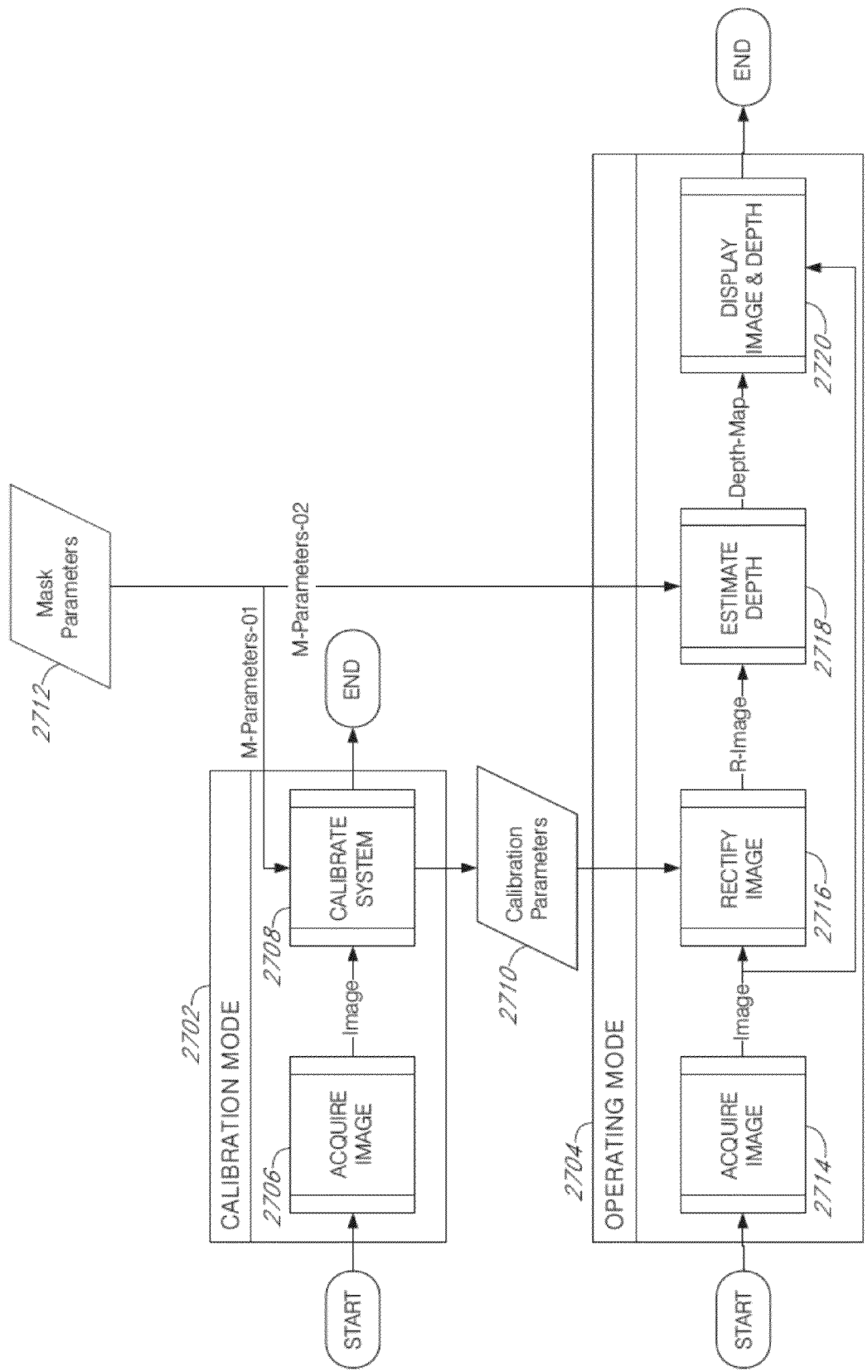
FIG. 27 is a block diagram illustrating an exemplary operation of a receiver device.

FIG. 27 is a block diagram illustrating an exemplary operation of a receiver device. The receiver device may operate according to a calibration mode 2702 and/or an operating mode 2704.

In calibration mode 2702, the receiver device may acquire an image 2706 and calibrates 2708 itself (e.g., adjust receptors for light intensity, etc.) to obtain calibration parameters 2710.

In operating mode 2704, the receiver device may acquire an image 2714 and rectifies the image 2716 based on the calibration parameters 2710. The depth estimation 2718 may then be performed on the rectified image by using known mask parameters 2712 (e.g., using the known code mask). A depth map may thus be generated and used/stored/displayed 2720 along with the image.

Figure 28:
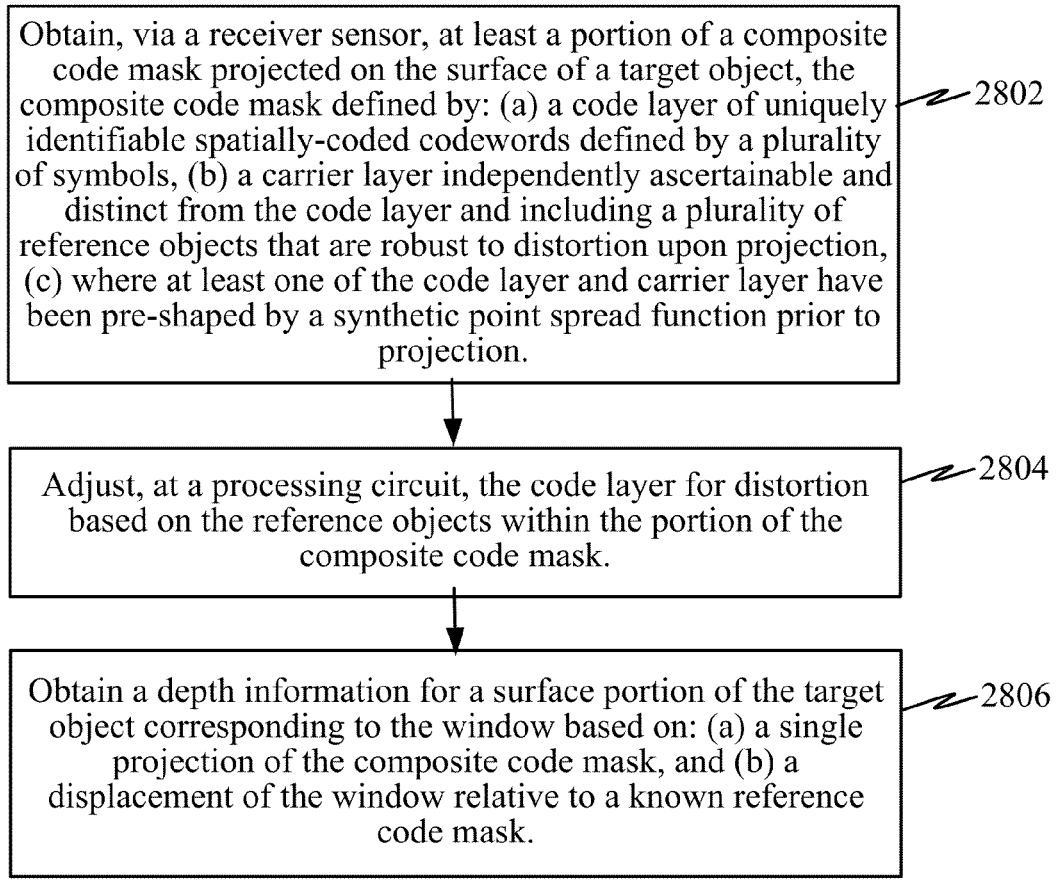
FIG. 28 illustrates an exemplary method for decoding a captured codeword within a composite code mask that is resistant to affine transformation.

FIG. 28 illustrates an exemplary method for decoding a captured codeword within a composite code mask that is resistant to affine transformation. A receiver sensor may receive at least a portion of a composite code mask projected on the surface of a target object, the composite code mask defined by: (a) a code layer of uniquely identifiable spatially-coded codewords defined by a plurality of symbols, (b) a carrier layer independently ascertainable and distinct from the code layer and including a plurality of reference objects that are robust to distortion upon projection, (c) where at least one of the code layer and carrier layer have been pre-shaped by a synthetic point spread function prior to projection 2802. In one example, the receiver sensor may capture the composite code mask in the infrared spectrum.

According to one example, the code layer may comprise n1 by n2 binary symbols, where n1 and n2 are integers greater than two. In the composite code mask, each symbol may be a line segment in one of two gray-scale shades distinct from the reference objects. In some instances, the symbols of the code layer may be staggered in at least one dimension. The carrier layer reference objects may comprise a plurality of equally spaced reference stripes with a guard interval in between. In one example, the reference stripes and the guard interval are of different widths. In another example, the width of each reference stripe relative to a guard interval width is determined by an expected optical spreading of a transmitter device and/or a receiver device.

The pre-shaping of at least one of the code layer and carrier layer may increase power efficiency during the projection of the composite code mask, such that more power is perceived by a receiver sensor in comparison to an unshaped composite code mask. The synthetic point spread function used may be selected from a plurality of point spread functions based on at least one of: (a) expected channel conditions through which the composite code mask is to be projected, (b) characteristics of surfaces onto which the composite code mask is projected, and/or (c) a sensitivity of the receiver sensor which is to receive the projected composite code mask. In some instances, the synthetic point spread function may have been selected from a plurality of point spread functions based on at least one of: (a) a first channel response for a projector that is to project the composite code mask; and/or (b) a second channel response for a path from a projector, that is to project the composite code mask, to the receiver sensor, that is to receive the composite code mask.

A processing circuit may adjust the code layer for distortion based on the reference objects within the portion of the composite code mask 2804. A depth information may then be obtained for a surface portion of the target object corresponding to the window based on: (a) a single projection of the composite code mask, and (b) a displacement of the window relative to a known reference code mask 2806.

Figure 29:
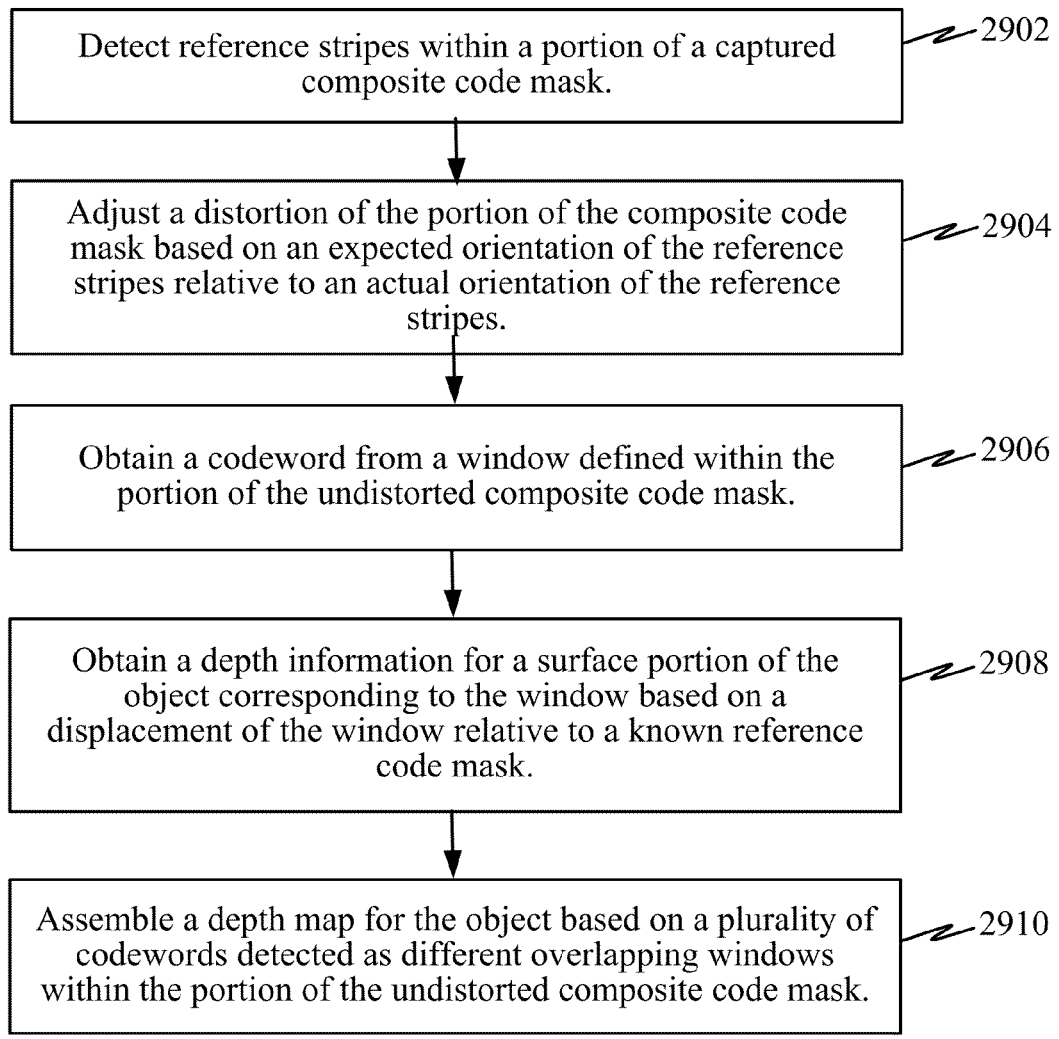
FIG. 29 illustrates a method for obtaining a depth map from a captured code mask.

FIG. 29 illustrates a method for obtaining a depth map from a captured code mask. Reference stripes may be detected within a portion of a captured composite code mask 2902. A distortion (e.g., skew, rotation, etc.) of the portion of the composite code mask may then be adjusted (or corrected) based on an expected orientation of the reference stripes relative to an actual orientation of the reference stripes 2904. A codeword may be obtained from a window defined within the portion of the undistorted composite code mask 2906. In one example, each codeword may be defined by a window that is k1 symbols by k2 symbols, where k1 and k2 are integers greater than two. In the composite code mask, each symbol may be a line segment in one of two gray-scale shades distinct from the reference stripes, for example. Overlapping windows along at least one direction on a known reference code mask may define different unique codewords from any other window along the same row or column.

In one example, the portion of the composite code mask may comprise a carrier layer defining the reference stripes and a code layer defining a plurality of uniquely identifiable spatially-coded codewords. The carrier layer may comprise a plurality of equally spaced reference stripes with a guard interval in between. In some instance, each reference stripe may be wider than the guard interval. The width of each reference stripe relative to a guard interval width may be determined by an expected optical spreading.

Depth information may be obtained for a surface portion of the object corresponding to the window based on a displacement of the window relative to a known reference code mask 2908. As illustrated in FIG. 3, a displacement d2 closest to the expected position of the codeword 312 in the reference code mask indicates a longer distance or depth while a displacement d2 further from the expected position of the codeword 312 indicates a shorter distance or depth. The reference code mask may comprise n1 by n2 binary symbols, where n1 and n2 are integers greater than two.

A depth map may be assembled for the object based on a plurality of codewords detected as different overlapping windows within the portion of the undistorted composite code mask 2910.

The receiver may be positioned along a same horizontal reference plane relative to a transmitter of the composite code mask and the object and the reference strips may be positioned vertically relative to the horizontal reference plane.

In one example, the receiver may obtain a two-dimensional image of the object. The receiver may also obtain depth information for the object based on one or more codewords having one or more windows defined within the portion of the composite code mask.

Reuse of Codebook Primitives

Another aspect provides an efficient way to design a code mask by reusing a codebook primitive to generate a code mask. A codebook primitive may include a plurality of spatially-coded and unique codewords within an n1 by n2 symbol structure. This codebook primitive (e.g., n1 by n2 symbol structure) may be repeated multiple times in one or more directions of the code mask. Repeating the codebook primitive permits reducing the codebook size which is desirable since that it reduces the number of comparisons that are needed to identify a particular codeword match.

Figure 30:
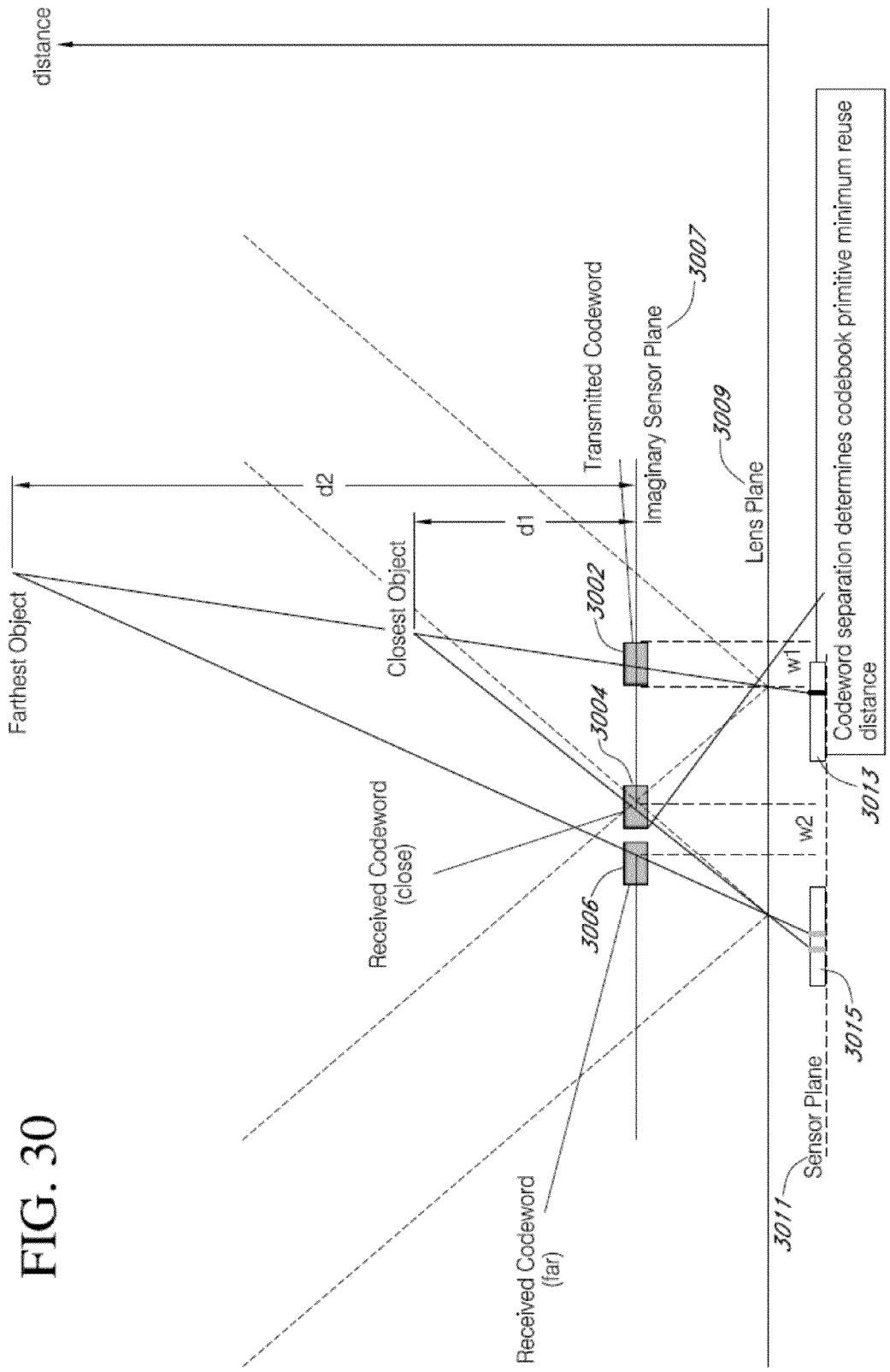
FIG. 30 illustrates how codeword separation dictates a codebook primitive reuse distance.

FIG. 30 illustrates how codeword separation dictates a codebook primitive reuse distance. The maximum disparity (e.g., shift of codeword) may be determined by the operating regime (e.g., nearest range to furthest range). Here, a transmitted codeword 3002 may be projected upon a scene/object within a minimum range d1 and maximum range d2. The projected codeword 3002 reflects on the scene/object and is captured by a receiving device. The displacement of the captured codeword 3004/3006 relative to the original location of the transmitted codeword 3002 may be used to ascertain depth. Here, the minimum range d1 and maximum range d2 have been defined from an imaginary (e.g., arbitrary) sensor plane 3007 to the closest and farthest object. However, the minimum and maximum ranges may defined from different reference planes, like a lens plane 3009 or a sensor plane 3011 for the transmitter 3013 and receiver 3015. In the case where the minimum/maximum ranges are defined from the sensor plane 3011, the maximum codeword disparity (e.g., shift of codeword) may be ascertained from the transmitted code mask and received code mask.

Where a codebook primitive is reused in a code mask, it is important to avoid detecting the same codeword from an adjacent codebook primitive (in the same code mask), also referred to as aliasing. In order to prevent aliasing of codewords from adjacent codebook primitives, a reuse distance (i.e., width w1 of codebook primitive 3002) should be greater than (or equal to) the maximum disparity (i.e., displacement distance w2) between the closest codeword instance 3004 and farthest codeword instance 3006.

Figure 31:
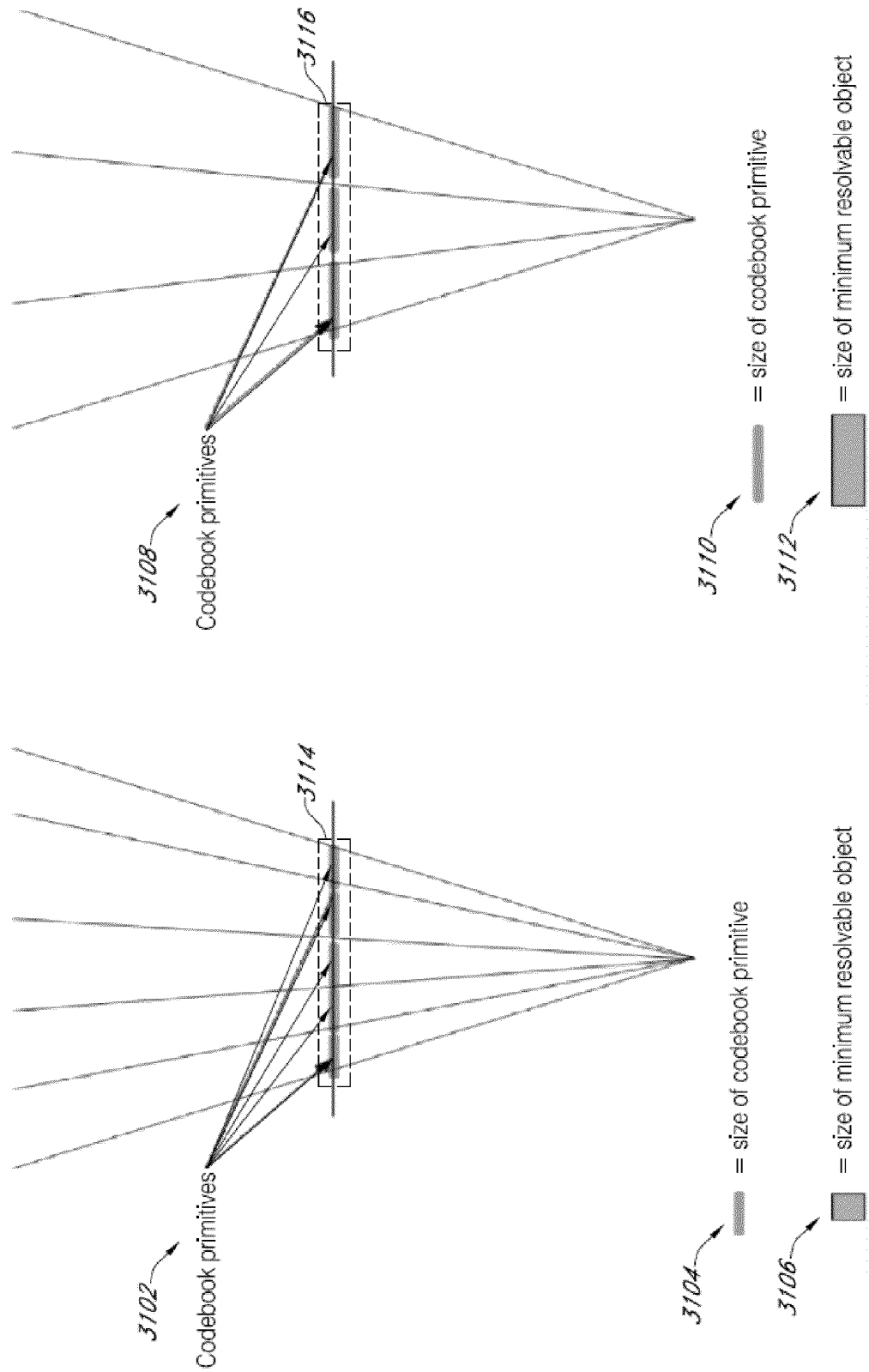
FIG. 31 illustrates the relationship between reuse distance of a codebook primitive and an object size.

FIG. 31 illustrates the relationship between reuse distance of a codebook primitive and an object size. According to two examples, a first codebook primitive 3102 is reused five times in a first code mask 3114 and a second codebook primitive 3108 is reused three times in a second code mask 3116. For a fixed number of horizontal codewords in a codebook primitive, increasing the reuse distance (e.g., width of the codebook primitive) reduces the minimum resolvable object size. For instance, for the first code mask 3114, the codebook primitive 3102 has a first size 3104 and the minimum resolvable object has a second size 3106, where the first size is more than the second size. By contrast, for the second code mask 3116, the second codebook primitive 3108 has a third size 3110 and the minimum resolvable object has a fourth size 3112, where the third size is less than the fourth size.

Figure 32:
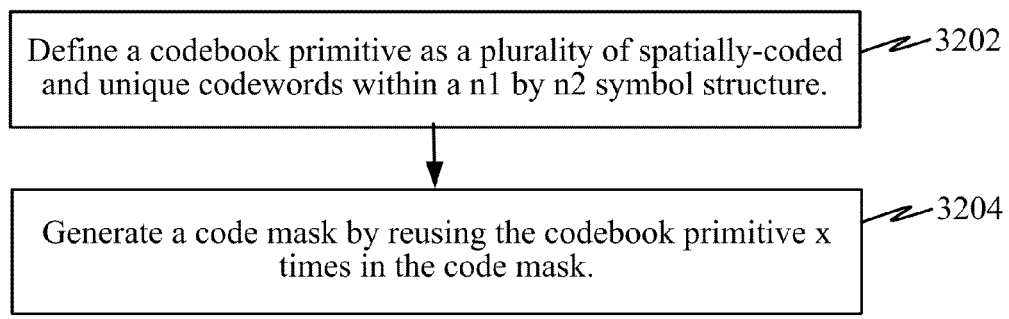
FIG. 32 is a flow diagram illustrating an exemplary method for constructing a code mask by reusing a codebook primitive.

FIG. 32 is a flow diagram illustrating an exemplary method for constructing a code mask by reusing a codebook primitive. A codebook primitive may be defined as a plurality of spatially-coded and unique codewords within a n1 by n2 symbol structure 3202. A code mask is then generated by reusing the codebook primitive x times in the code mask 3204.

The size of the codebook primitive may be a function of the minimum resolvable object size on which the code mask is to be projected. That is, for particular minimum and/or maximum ranges to which the code mask is to be projected, the size of the codebook primitive may be selected to achieve a certain resolution (e.g., minimum resolvable object size) at those ranges. For instance, the more times the codebook primitive is reused in the code mask, the smaller the minimum resolvable object size may be when the code mask is projected. Consequently, the size of the codebook primitive may be a function of the distance range to which the code mask is to be projected onto a scene or object. In one example, the smaller the codebook primitive, the smaller the minimum resolvable object size becomes when the code mask is projected. In another example, the smaller the codeword size, the smaller the minimum resolvable object size is when the code mask is projected. According to one implementation, the codeword size for all codewords may be the same (e.g., codewords may have the same width). In one example, the size of the codebook primitive may refer to one of either a width or a length of the codebook primitive.

Each spatially-coded and unique codeword may be a combination of m symbols (e.g., see FIGS. 9 and 10). The plurality of spatially-coded and unique codewords in the codebook primitive may be a subset of all possible combinations of the m symbols within the n1 by n2 symbol structure.

In one example, the plurality of codewords may be defined from different overlapping k1 by k2 windows within the symbol structure (e.g., illustrated in code masks 1102 and 1106 of FIG. 11A). The windows defining the plurality of codewords may be co-linear and spatially overlapping.

The distance between repeated instances of a first codeword in the code mask may be greater than a maximum expected displacement for the first codeword when the code mask is projected onto an object and such projection is perceived by a receiver device (e.g., see FIG. 30).

The receiver device may be co-planar with a transmitter device that projects the code mask. The distance between repeated instances of a first codeword may be the same as a width of the codebook primitive.

In one example, a width of the codebook primitive is greater than a maximum expected displacement for the first codeword when the code mask is projected onto an object and such projection is perceived by a receiver device. The receiver device is co-planar with a transmitter device that projects the code mask.

The code mask may facilitate obtaining depth information for a surface portion of an object onto which the code mask is projected. The codebook primitive may be tessellated x times (e.g., illustrated in FIG. 31) to cover a desired field of view onto which the codebook is to be projected. That is, the codebook primitive may be replicated or repeated, e.g., in one or more directions/dimensions, to construct a larger code mask. In one example, x may be an integer value equal to or greater than zero. That is, depending on the minimum object resolution sought, the size of the codeword primitive and/or code mask may be adjusted (e.g., the larger the codeword primitive and/or code mask the higher resolution attainable).

Exemplary Pre-Shaping Code Mask Carriers Using Point Spread Functions

A point spread function (PSF) describes a response of an imaging system to a point source or point object. One aspect provides for pre-shaping a code mask carrier using a synthetic point spread function to improve the amount of energy in a code mask when transmitted across a transmission channel. A synthetic point spread function is a form of pre-emphasis that is pre-computed intentionally inserted into the transmission system to counteract some effect of the transmission channel. A pre-shaping by use of a synthetic PSF may seek to optimize a transmission (e.g. projection of a particular mask) according to the codemask being projected and/or channel conditions (e.g., projection distance, projection surface characteristics, illumination power, receiver characteristics, etc.)

Figure 33:
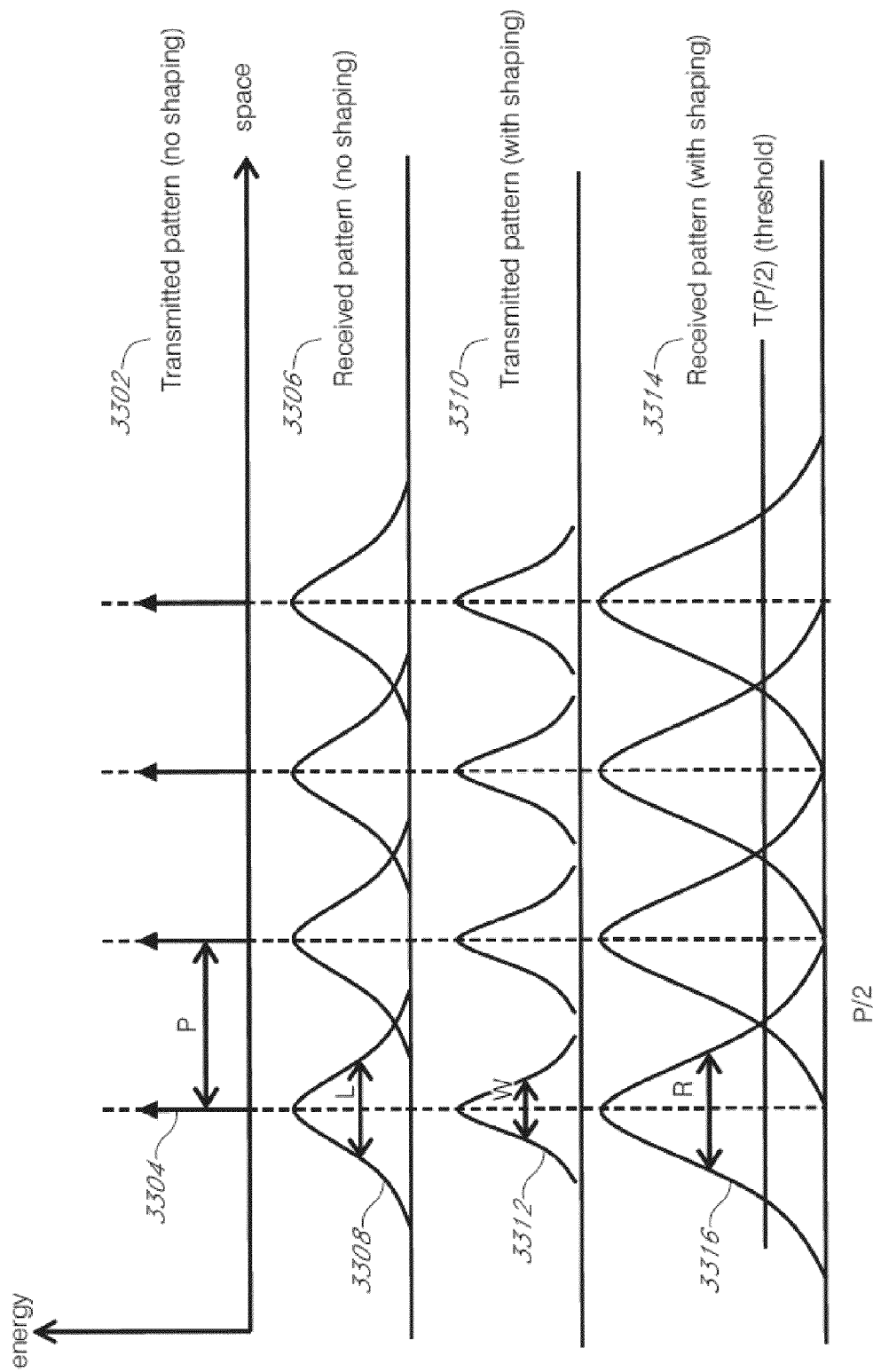
FIG. 33 illustrates an example of how a point spread function may be applied to an object to obtain an image.

FIG. 33 illustrates an example of how a point spread function may be applied to an object to obtain an image. A more general term for the PSF is a system's impulse response, the PSF being the impulse response of a focused optical system.

Here, a first transmitted pattern 3302 of pulses 3304 having a particular energy level is illustrated where no pre-shaping has been performed to the pulses 3304. The same first transmitted pattern 3302 is also illustrated as a received patterned 3306 of spread pulses 3308. As can be perceived, the narrow transmitted pulse 3304 has propagated over a transmission channel and is received as a first spread-out pulse 3308.

By contrast, a second transmitted pattern 3310 of pre-shaped pulses 3312 having a particular energy level is illustrated. The same second transmitted pattern 3310 is also illustrated as a received patterned 3314 of second spread pulses 3316. As can be perceived, the pre-shaped transmitted pulse 3312 has propagated over a transmission channel and is received as the second spread-out pulses 3316. It should be noted that the second received second spread-out pulses 3316 are received at a relatively higher energy level than the first spread-out pulse 3308.

The PSF in many contexts can be thought of as the extended blob in an image that represents an unresolved object. In functional terms it is the spatial domain version of the modulation transfer function. The degree of spreading (blurring) of the point object is a measure for the quality of an imaging system.

In incoherent imaging systems such as fluorescent microscopes, telescopes or optical microscopes, the image formation process is linear in power and described by linear system theory. This means that when two objects A and B are imaged simultaneously, the result is equal to the sum of the independently imaged objects. In other words: the imaging of object A is unaffected by the imaging of object B and vice versa, owing to the non-interacting property of photons.

The image of a complex object can then be seen as a convolution of the true object and the PSF. However, when the detected light is coherent, image formation is linear in the complex field. Recording the intensity image then can lead to cancellations or other non-linear effects.

FIG. 34A illustrates carrier stripes of a code mask carrier in the spatial domain.

FIG. 34B illustrates an example of the resulting carrier stripes in the spatial-frequency domain after they have propagated through a transmission channel.

FIG. 34A illustrates vertical stripes, s1 3402 and s2 3404, which may represent part of a code mask carrier in a structured light system previously mentioned. When transformed into a spatial frequency domain 3406 (as illustrated FIG. 34B), the spectral response of these stripes may conceptually be shown as curves S1 and S2 (in FIG. 34B). For a given power level (dB), S1 3408 and S2 3410 have a width X, and intersect at a distance, $\Delta 1$, above the noise floor.

Where there is no concern of a power limitation, having a set of responses as illustrated in FIGS. 34A and 34B may be entirely acceptable. However, in a power limited system, such as a cell phone, portable camera, or small projector, it may be desired to use less power while still transmitting enough power to be able to resolve objects. One way to achieve this goal is to apply a synthetic point spread function (PSF) 3412 to each of the stripes (i.e., carriers), s1 3402 and s2 3404, prior to transmission, as illustrated in FIG. 35A.

FIG. 35A illustrates how a synthetic point spread function may be applied to carrier stripes to pre-shape the carrier stripes in the spatial domain.

FIG. 35B illustrates an example of the resulting pre-shaped carrier stripes in the spatial-frequency domain after they have propagated through a transmission channel.

In FIG. 35A, the PSF 3412 will allow the stripe s1 3402 and s2 3404 to be shaped in such a way that there will be an increase in power efficiency during their transmission (e.g., projection and/or incident reflection on an object). As a result, a spectral response may look as in FIG. 35B, which shows that for the same given power level (dB), S1 3414 and S2 3416 may have a width of 3×. In addition, the intersection of S1 3414 and S2 3416 is now a distance $\Delta 2$, above the noise floor, which reflects the increase of transmitted power relative to FIG. 34B.

Depending on the distance D1 between the vertical stripes 3402 and 3404 the width w of the PSF's used (see FIG. 36), different transmission efficiency may be achieved which is either higher or lower than the 3× (three times the power transmitted without PSF pulse shaping) illustrated in FIGS. 35A and 35B.

In addition, a PSF may not just be for the optical system of the projector, but a PSF for a transmission channel may also be estimated. The channel may be comprised into two parts: (a) the space where structured light travels from the transmitter to the object; and (b) the space where the reflected structured light from the object travels to the receiver. Thus, it a PSF may be selected for a worst case scenario to ensure enough resolvability between small objects while still using a limited power source.

Figure 36:
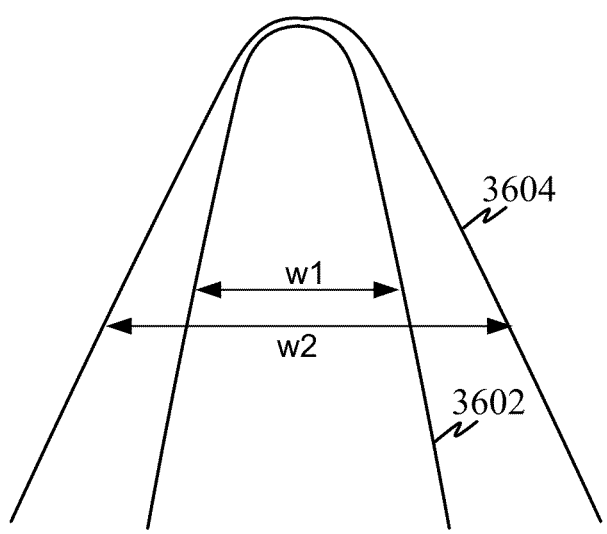
FIG. 36 illustrates that a bank of point spread functions may be available from which one PSF may be selected to pre-shape a code mask carrier prior to transmission.

FIG. 36 illustrates that a bank of point spread functions may be available from which one PSF may be selected to pre-shape a code mask carrier prior to transmission. This may allow selecting from among a plurality of PSFs depending on the stripe spacing (for a code mask carrier) and transmission channel conditions. For example, a PSF bank may be available, as illustrated in FIG. 36, from which different PSF's 3602 and 3604 of varying widths (e.g., w1 and w2) may be selected. In selection of a PSF, a balance is usually sought between the amount of power transmitted and the loss of resolution of in the received code mask. For instance, the wider the PSF the more resolution is lost for the symbols making up a codeword (e.g., higher frequencies get filed out). Conversely, a narrower PSF may transmit less energy as perceived by a receiver of a codeword. Thus, these constraints are balanced in the selected of a particular PSF.

The effect of the imaging PSF is to blur or otherwise distort the transmitted pattern. The size of the blur kernel sets a limit on the spacing and width of the symbols in the transmitted pattern, and thus on the system resolution. The above constraint in turn places a limit on the received per symbol power contained in the pattern. Based on the relationships between the pattern symbol period and the PSF size, a pre-emphasized shaping may be applied to the transmitted pattern prior to transmission in order to increase the symbol power in accordance with the constraints illustrated in FIGS. 35A and 35B. The result of such shaping preserves or increases resolution without sacrificing power or system reliability by increasing the signal to noise ratio in the received pattern symbols.

The PSF selection is dependent on the operating point of the system which is a trade-off between robustness/reliability and performance, i.e., resolution. The PSF design may be based on the expected channel and a balance between robustness and performance which is application dependent.

The PSF comprises the distortion effects for the path light travels from the source to the camera focal plane. These channel effects may include geometrical distortion, lens aberrations, lens action, diffraction, object size and composition, scene reflectance, and motion effects. The PSF limits the maximum resolution of the system and therefore the space between the pattern resolution and the limiting PSF regime should not go unused. Modulation of the nominal pattern by a synthetic shaping function whose design is dependent on the source to camera path results in filling this resolution gap so that the system is power and resolution matched. According to the channel model, a transmitted pattern so designed will result in optimum performance.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a transmitter device for projecting a composite code mask, comprising:
   obtaining a composite code mask on a non-transitory tangible medium, the composite code mask including a code layer combined with a carrier layer, wherein
      the code layer including uniquely identifiable spatially-coded codewords defined by a plurality of symbols,
      the carrier layer independently ascertainable and distinct from the code layer and including a plurality of reference objects that are robust to distortion upon projection, and
      at least one of the code layer and carrier layer are pre-shaped by a synthetic point spread function prior to projection; and
   projecting, from the transmitter device, at least a portion of the composite code mask onto a target object to help a receiver ascertain depth information for the target object with a single projection of the composite code mask.

2. The method of claim 1, wherein the composite code mask is projected in an infrared spectrum.

3. The method of claim 1, wherein the code layer comprises n1 by n2 binary symbols, where n1 and n2 are integers greater than two.

4. The method of claim 1, wherein overlapping windows along at least one direction on the code layer define different unique codewords from any other window along the same row or column.

5. The method of claim 1, wherein each symbol in the composite code mask is a line segment in one of two gray-scale shades distinct from the reference objects.

6. The method of claim 1, wherein the symbols of the code layer are staggered in at least one dimension.

7. The method of claim 1, wherein the carrier layer reference objects comprise a plurality of equally spaced reference stripes with a guard interval in between.

8. The method of claim 7, wherein the reference stripes and the guard interval are of different widths.

9. The method of claim 7, wherein the width of each reference stripe relative to a guard interval width is determined by an expected optical spreading of a transmitter device and/or a receiver device.

10. The method of claim 7, wherein the code layer and carrier layer are combined by overlaying the carrier layer over the code layer such that the code layer symbols appear within the reference stripes of the carrier layer.

11. The method of claim 1, wherein pre-shaping at least one of the code layer and carrier layer by a synthetic point spread function prior to projection includes:
    ascertaining one or more conditions for a channel through which the code mask is to be projected;
    obtaining the synthetic point spread function, based on the one or more conditions, to compensate for the distortions caused by the channel; and
    applying the synthetic point spread function to the at least one of the code layer and the carrier layer.

12. The method of claim 1, wherein pre-shaping at least one of the code layer and carrier layer by a synthetic point spread function prior to projection includes:
    obtaining a pre-shaping layer that compensates for distortions in a channel through which the code mask is to be projected; and
    combining the pre-shaping layer as part of the composite mask.

13. A transmitter device for projecting a composite code mask, comprising:
    a non-transitory medium defining a composite code mask, the composite code mask including a code layer combined with a carrier layer, wherein
       the code layer includes uniquely identifiable spatially-coded codewords defined by a plurality of symbols,
       the carrier layer is independently ascertainable and distinct from the code layer and includes a plurality of reference objects that are robust to distortion upon projection, and
       at least one of the code layer and carrier layer are pre-shaped by a synthetic point spread function prior to projection; and
    a projector for projecting at least a portion of the composite code mask onto a target object to help a receiver ascertain depth information for the target object with a single projection of the composite code mask.

14. The transmitter device of claim 13, wherein the composite code mask is projected in an infrared spectrum.

15. The transmitter device of claim 13, wherein the code layer comprises n1 by n2 binary symbols, where n1 and n2 are integers greater than two.

16. The transmitter device of claim 13, wherein overlapping windows along at least one direction on the code layer define different unique codewords from any other window along the same row or column.

17. The transmitter device of claim 13, wherein each symbol in the composite code mask is a line segment in one of two gray-scale shades distinct from the reference objects.

18. The transmitter device of claim 13, wherein the symbols of the code layer are staggered in at least one dimension.

19. The transmitter device of claim 13, wherein the carrier layer reference objects comprise a plurality of equally spaced reference stripes with a guard interval in between.

20. The transmitter device of claim 19, wherein the reference stripes and the guard interval are of different widths.

21. The transmitter device of claim 19, wherein the width of each reference stripe relative to a guard interval width is determined by an expected optical spreading of a transmitter device and/or a receiver device.

22. The transmitter device of claim 19, wherein the code layer and carrier layer are combined by overlaying the carrier layer over the code layer such that the code layer symbols appear within the reference stripes of the carrier layer.

23. The transmitter device of claim 13, wherein the at least one of the code layer and carrier layer are pre-shaped by a synthetic point spread function prior to projection by:
    ascertaining one or more conditions for a channel through which the code mask is to be projected;
    obtaining the synthetic point spread function, based on the one or more conditions, to compensate for the distortions caused by the channel; and
    applying the synthetic point spread function to the at least one of the code layer and the carrier layer.

24. The transmitter device of claim 13, wherein the at least one of the code layer and carrier layer are pre-shaped by a synthetic point spread function prior to projection by:
    obtaining a pre-shaping layer that compensates for distortions in a channel through which the code mask is to be projected; and
    combining the pre-shaping layer as part of the composite mask.

25. A transmitter device for projecting a composite code mask, comprising:
- means for storing a composite code mask, the composite code mask including a code layer combined with a carrier layer, wherein
  - the code layer includes uniquely identifiable spatially-coded codewords defined by a plurality of symbols,
  - the carrier layer is independently ascertainable and distinct from the code layer and includes a plurality of reference objects that are robust to distortion upon projection, and
  - at least one of the code layer and carrier layer are pre-shaped by a synthetic point spread function prior to projection; and
- means for projecting at least a portion of the composite code mask onto a target object to help a receiver ascertain depth information for the target object with a single projection of the composite code mask.

26. The transmitter device of claim 25, wherein the symbols of the code layer are staggered in at least one dimension.

27. The transmitter device of claim 25, wherein the carrier layer reference objects comprise a plurality of equally spaced reference stripes with a guard interval in between.

28. The transmitter device of claim 27, wherein the reference stripes and the guard interval are of different widths.

29. The transmitter device of claim 27, wherein the width of each reference stripe relative to a guard interval width is determined by an expected optical spreading of a transmitter device and/or a receiver device.

30. The transmitter device of claim 27, wherein the code layer and carrier layer are combined by overlaying the carrier layer over the code layer such that the code layer symbols appear within the reference stripes of the carrier layer.

31. A non-transitory machine-readable storage medium having instructions stored thereon for projecting a composite code mask, which when executed by at least one processor causes the at least one processor to:
- obtain a composite code mask including a code layer combined with a carrier layer, wherein
  - the code layer including uniquely identifiable spatially-coded codewords defined by a plurality of symbols,
  - the carrier layer independently ascertainable and distinct from the code layer and including a plurality of reference objects that are robust to distortion upon projection, and
  - at least one of the code layer and carrier layer are pre-shaped by a synthetic point spread function prior to projection; and
- project, from the transmitter device, at least a portion of the composite code mask onto a target object to help a receiver ascertain depth information for the target object with a single projection of the composite code mask.

32. The non-transitory machine-readable storage medium of claim 31, wherein the symbols of the code layer are staggered in at least one dimension.

33. The non-transitory machine-readable storage medium of claim 31, wherein the carrier layer reference objects comprise a plurality of equally spaced reference stripes with a guard interval in between.

34. The non-transitory machine-readable storage medium of claim 33, wherein the reference stripes and the guard interval are of different widths.

35. The non-transitory machine-readable storage medium of claim 33, wherein the width of each reference stripe relative to a guard interval width is determined by an expected optical spreading of a transmitter device and/or a receiver device.

36. The non-transitory machine-readable storage medium of claim 33, wherein the code layer and carrier layer are combined by overlaying the carrier layer over the code layer such that the code layer symbols appear within the reference stripes of the carrier layer.

37. A method for generating a composite code mask, comprising:
- obtaining a code layer of uniquely identifiable spatially-coded codewords defined by a plurality of symbols;
- obtaining a carrier layer independently ascertainable and distinct from the code layer and including a plurality of reference objects that are robust to distortion upon projection;
- pre-shaping at least one of the code layer and carrier layer by a synthetic point spread function prior to projection;
- obtaining a composite code mask by combining the code layer and carrier layer, the composite code mask serving for single-projection depth sensing; and
- storing the composite code mask on a non-transitory tangible medium.

38. The method of claim 37, wherein the non-transitory tangible medium is at least one of:
- a single film medium embodying the composite code mask;
- a first file medium storing the code layer and a second film medium storing the carrier layer;
- a digital storage device in which the composite code mask stored; and
- a digital storage device in which the code layer and carrier layer are stored.

39. The method of claim 37, wherein the code layer comprises n1 by n2 binary symbols, where n1 and n2 are integers greater than two.

40. The method of claim 37, wherein overlapping windows along at least one direction on the code layer define different unique codewords from any other window along the same row or column.

41. The method of claim 37, wherein the symbols of the code layer are staggered in at least one dimension.

42. The method of claim 37, wherein the carrier layer reference objects comprise a plurality of equally spaced reference stripes with a guard interval in between.

43. The method of claim 42, wherein the reference stripes and the guard interval are of different widths.

44. The method of claim 42, wherein the code layer and carrier layer are combined by overlaying the carrier layer over the code layer such that the code layer symbols appear within the reference stripes of the carrier layer.

45. The method of claim 37, wherein pre-shaping at least one of the code layer and carrier layer by a synthetic point spread function prior to projection includes:
- ascertaining one or more conditions for a channel through which the code mask is to be projected;
- obtaining the synthetic point spread function, based on the one or more conditions, to compensate for the distortions caused by the channel; and
- applying the synthetic point spread function to the at least one of the code layer and the carrier layer.

46. The method of claim 37, wherein pre-shaping at least one of the code layer and carrier layer by a synthetic point spread function prior to projection includes:
- obtaining a pre-shaping layer that compensates for distortions in a channel through which the code mask is to be projected; and
- combining the pre-shaping layer as part of the composite mask.

47. The method of claim 37, wherein a transmitter device dynamically performs the pre-shaping of the at least one of the code layer and carrier layer and combines the code layer and carrier layer to obtain the composite code mask.

48. The method of claim 37, wherein a mask generator pre-generates at least one of the code layer, the carrier layer, and the composite code mask.

49. A mask generating device, comprising:
a processing circuit adapted to
obtain a code layer of uniquely identifiable spatially-coded codewords defined by a plurality of symbols;
obtain a carrier layer independently ascertainable and distinct from the code layer and including a plurality of reference objects that are robust to distortion upon projection;
pre-shape at least one of the code layer and carrier layer by a synthetic point spread function prior to projection;
obtain a composite code mask by combining the code layer and carrier layer, the composite code mask serving for single-projection depth sensing; and
a non-transitory tangible medium for storing the composite code mask.

50. The mask generating device of claim 49, wherein the non-transitory tangible medium is at least one of:
a single film medium embodying the composite code mask;
a first file medium storing the code layer and a second film medium storing the carrier layer;
a digital storage device in which the composite code mask stored; and
a digital storage device in which the code layer and carrier layer are stored.

51. The mask generating device of claim 49, wherein the code layer comprises n1 by n2 binary symbols, where n1 and n2 are integers greater than two.

52. The mask generating device of claim 49, wherein overlapping windows along at least one direction on the code layer define different unique codewords from any other window along the same row or column.

53. The mask generating device of claim 49, wherein the symbols of the code layer are staggered in at least one dimension.

54. The mask generating device of claim 49, wherein the carrier layer reference objects comprise a plurality of equally spaced reference stripes with a guard interval in between.

55. The mask generating device of claim 54, wherein the reference stripes and the guard interval are of different widths.

56. The mask generating device of claim 54, wherein the code layer and carrier layer are combined by overlaying the carrier layer over the code layer such that the code layer symbols appear within the reference stripes of the carrier layer.

57. The mask generating device of claim 49, wherein pre-shaping at least one of the code layer and carrier layer by a synthetic point spread function prior to projection, the processing circuit is adapted to:
ascertain one or more conditions for a channel through which the code mask is to be projected;
obtain the synthetic point spread function, based on the one or more conditions, to compensate for the distortions caused by the channel; and
apply the synthetic point spread function to the at least one of the code layer and the carrier layer.

58. The mask generating device of claim 49, wherein pre-shaping at least one of the code layer and carrier layer by a synthetic point spread function prior to projection the processing circuit is adapted to:
obtain a pre-shaping layer that compensates for distortions in a channel through which the code mask is to be projected; and
combine the pre-shaping layer as part of the composite mask.

59. A mask generating device, comprising:
means for obtaining a code layer of uniquely identifiable spatially-coded codewords defined by a plurality of symbols;
means for obtaining a carrier layer independently ascertainable and distinct from the code layer and including a plurality of reference objects that are robust to distortion upon projection;
means for pre-shaping at least one of the code layer and carrier layer by a synthetic point spread function prior to projection;
means for obtaining a composite code mask by combining the code layer and carrier layer, the composite code mask serving for single-projection depth sensing; and
means for storing the composite code mask on a tangible medium.

60. The mask generating device of claim 59, wherein the symbols of the code layer are staggered in at least one dimension.

61. The mask generating device of claim 59, wherein the means for pre-shaping at least one of the code layer and carrier layer by a synthetic point spread function prior to projection includes:
means for ascertaining one or more conditions for a channel through which the code mask is to be projected;
means for obtaining the synthetic point spread function, based on the one or more conditions, to compensate for the distortions caused by the channel; and
means for applying the synthetic point spread function to the at least one of the code layer and the carrier layer.

62. The mask generating device of claim 59, wherein pre-shaping at least one of the code layer and carrier layer by a synthetic point spread function prior to projection includes:
means for obtaining a pre-shaping layer that compensates for distortions in a channel through which the code mask is to be projected; and
means for combining the pre-shaping layer as part of the composite mask.

63. A non-transitory machine-readable storage medium having instructions stored thereon for generating a composite code mask, which when executed by at least one processor causes the at least one processor to:
obtain a code layer of uniquely identifiable spatially-coded codewords defined by a plurality of symbols;
obtain a carrier layer independently ascertainable and distinct from the code layer and including a plurality of reference objects that are robust to distortion upon projection;
pre-shape at least one of the code layer and carrier layer by a synthetic point spread function prior to projection;
obtain a composite code mask by combining the code layer and carrier layer, the composite code mask serving for single-projection depth sensing; and
store the composite code mask on a non-transitory tangible medium.

64. The non-transitory machine-readable storage medium 63, wherein the symbols of the code layer are staggered in at least one dimension.

* * * * *